US012637380B2

(12) United States Patent
Graff et al.

(10) Patent No.: US 12,637,380 B2
(45) Date of Patent: May 26, 2026

(54) MOLTEN GLASS TRANSPORTER, TRANSPORT CUP, ENDCAP, AND METHODS

(71) Applicant: Owens-Brockway Glass Container Inc., Perrysburg, OH (US)

(72) Inventors: Stephen M. Graff, Maumee, OH (US); Karl Johnston, Perrysburg, OH (US); Thomas Kirkman, Perrysburg, OH (US); Arturo Alegria Vega, Lima (PE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 244 days.

(21) Appl. No.: 18/113,925

(22) Filed: Feb. 24, 2023

(65) Prior Publication Data

US 2023/0271870 A1 Aug. 31, 2023

Related U.S. Application Data

(60) Provisional application No. 63/313,981, filed on Feb. 25, 2022.

(51) Int. Cl.
*C03B 7/14* (2006.01)
(52) U.S. Cl.
CPC ..................................... *C03B 7/14* (2013.01)
(58) Field of Classification Search
None
See application file for complete search history.

(56) References Cited

U.S. PATENT DOCUMENTS

| | | | |
|---|---|---|---|
| 1,415,824 A | | 5/1922 | Ferngren |
| 1,608,326 A | | 11/1926 | Lawson |
| 1,617,598 A | | 2/1927 | Howard |
| 1,853,002 A | | 4/1932 | Howard |
| 2,147,307 A | | 2/1939 | McNamara et al. |
| 3,888,647 A | * | 6/1975 | Breeden ................ C03B 9/3875 |
| | | | 65/83 |

(Continued)

FOREIGN PATENT DOCUMENTS

WO WO-2011151047 A2 * 12/2011 ........... B65D 1/0207

OTHER PUBLICATIONS

JP 2006265085 machine translation, Fukuda et al., Preform Production, Oct. 2006 (Year: 2006).*

(Continued)

*Primary Examiner* — Queenie S Dehghan

(57) ABSTRACT

A molten glass transport cup includes a conduit having an inlet and an outlet, and an endcap to cover or close, and uncover or open, the conduit outlet. The cup also may include a fluid exhaust outlet between the conduit and the endcap, and one or more fluid supply passages having one or more interior inlets located radially inwardly of the exhaust outlet. A molten glass transporter may include the cup and a conduit carrier including a sleeve at least partially circumscribing the cup. A related method may include receiving a molten glass charge in the cup in contact with an inner surface of the conduit, supplying fluid into the cup to displace at least a portion of the glass charge away from the transport cup, controlling an amount of the fluid between the charge and the transport cup, and moving the endcap to permit the charge to exit the conduit.

25 Claims, 30 Drawing Sheets

(56)　　　　　References Cited

U.S. PATENT DOCUMENTS

| | | | | |
|---|---|---|---|---|
| 5,394,910 | A * | 3/1995 | Sweetland | C03B 9/1932 |
| | | | | 65/304 |
| 5,511,593 | A | 4/1996 | Sweetland | |
| 7,690,222 | B2 | 4/2010 | Cramer | |
| 10,737,963 | B2 | 8/2020 | Suzuki et al. | |
| 2004/0182112 | A1 * | 9/2004 | Hosoe | C03B 19/1055 |
| | | | | 65/29.21 |
| 2005/0022559 | A1 | 2/2005 | Hermening et al. | |
| 2020/0216348 | A1 | 7/2020 | Suzuki et al. | |
| 2023/0097028 | A1 * | 3/2023 | Flynn | C03B 40/00 |
| | | | | 65/29.11 |
| 2023/0271869 | A1 | 8/2023 | Graff et al. | |

OTHER PUBLICATIONS

CN 107298523 machine translation, Zhang, Zhong, Choke Plug and a Glass Container Primary Die Assembly, Oct. 2017 (Year: 2017).*
PCT Search Report and Written Opinion, Int. Application No. PCT/US2023/013850, Applicant: Owens-Brockway Glass Container Inc, Mailed: Oct. 12, 2023.

Chilean Informe Pericial (Expert Report), Application No. 202402514, Applicant: Owens-Brockway Glass Container Inc., Dated Aug. 5, 2025.
Chilean de Busqueda (Report Report), Application No. 202402514, Applicant: Owens-Brockway Glass Container Inc., Dated Aug. 5, 2025.
Chile Respuesta Pericial (Expert Report), Application No. 202402514, Applicant: Owens-Brockway Glass Container Inc., Dated: Nov. 14, 2025.
Chile Informe de Busqueda (Search Report), Application No. 202402514, Applicant: Owens-Brockway Glass Container Inc., Dated: Nov. 14, 2025.
United Arab Emirates Substantive Examination Result 6005848, Application No. P2024-02159, Owner: Owens—Brockway Glass Container Inc., Title: Molten Glass Transporter, Transport Cup, Endcap, and Methods, Dated: Apr. 16, 2026.
United Arab Emirates Search Report, Application No. P2024-02159, Owner: Owens-Brockway Glass Container Inc., Dated: Apr. 16, 2026.
United Arab Emirates Examination Result, Application No. P2024-02159, Owner: Owens-Brockway Glass Container Inc., Dated: Apr. 16, 2026.

* cited by examiner

MOLTEN GLASS TRANSPORTER, TRANSPORT CUP, ENDCAP, AND METHODS

TECHNICAL FIELD

This patent application discloses apparatuses and methods for glass container manufacturing and, more particularly, apparatuses and methods for transporting molten glass from a glass feeder to blank molds.

BACKGROUND

Glass container manufacturing processes typically include the following general process steps: a) melting raw materials in a glass melter to produce molten glass; b) producing a discrete portion of the molten glass as a "gob" by flowing a stream of the molten glass out of a gob feeder and cutting the stream with shears to produce the molten glass gob; c) delivering the molten glass gob to a blank mold that forms the molten glass gob into a pliable parison; d) opening the blank mold and transferring the parison to a blow mold; and e) blowing the parison against internal walls of the blow mold to form a relatively rigid glass container.

In modern processes, the delivering step uses conventional gob delivery equipment including a lengthy and widespread series of distributor funnels and scoops, troughs, and deflectors that cooperate to convey glass gobs from the gob feeder to the blank molds. Because the gob delivery equipment is required to be disposed at a minimum angle to convey glass gobs at a desired velocity, the gob delivery equipment can be relatively tall, often extending between ten and fourteen feet in height.

In contrast, many decades ago some implementations of the delivering step used transport cups to receive glass gobs from gob feeders and deposit the glass gobs into blank molds directly below the gob feeders. But use of transport cups suffered from many disadvantages. For example, mating surfaces of different components of the transport cups produce sharp interior junctions that form parting lines on the glass gobs. And the parting lines carry through the blank and blow molding steps, ultimately resulting in an appearance of undesirable lines on the formed glass containers. In another example, excessive contact of the gobs with the transport cups led to thermally inhomogeneous gobs delivered to molds. For example, a detrimental temperature drop on the order of 300° C. can be seen at lower axial ends of glass gobs loaded into transport cups due to contact of the ends with bottoms of the transport cups.

SUMMARY OF THE DISCLOSURE

The present disclosure embodies a number of aspects that can be implemented separately from or in combination with each other.

A molten glass transport cup, in accordance with one aspect of the disclosure, includes a conduit having an inlet, an outlet, and a passage extending between the inlet and the outlet along a conduit passage axis. The cup also includes an endcap to selectively cover and uncover the conduit outlet, and being movable relative to the conduit to a closed position where the endcap covers the conduit outlet, and to an open position where the endcap uncovers the conduit outlet. The cup further includes a fluid exhaust outlet between the conduit and the endcap, and one or more fluid supply passages having one or more interior inlets located radially inwardly of the fluid exhaust outlet.

In accordance with an additional aspect of the disclosure, a molten glass transport cup endcap includes a lower end, an upper end axially opposite of the lower end, and a plurality of fluid supply passages extending between the lower and upper ends and having lower openings open to the lower end and upper openings open to the upper end.

In accordance with another aspect of the disclosure, there is provided a molten glass transporter comprising a transport cup including a conduit including an inlet and an outlet, and an endcap movably carried underneath the conduit to open and close the outlet of the conduit. The transporter also includes a conduit carrier carrying the transport cup therein and including a sleeve at least partially circumscribing the conduit of the transport cup.

In accordance with a further aspect of the disclosure, there is provided a method of transporting a molten glass charge. The method includes receiving a molten glass charge in a transport cup having a conduit and an endcap to selectively open and close the conduit. The method also includes supplying fluid into the transport cup to displace at least a portion of the glass charge away from at least a portion of the endcap and thereby establish a gap between the molten glass charge and the transport cup. The method further includes controlling an amount of the fluid in the transport cup between the molten glass charge and the transport cup, and moving the endcap to permit the molten glass charge to exit the conduit.

DETAILED DESCRIPTION

Figure 1:
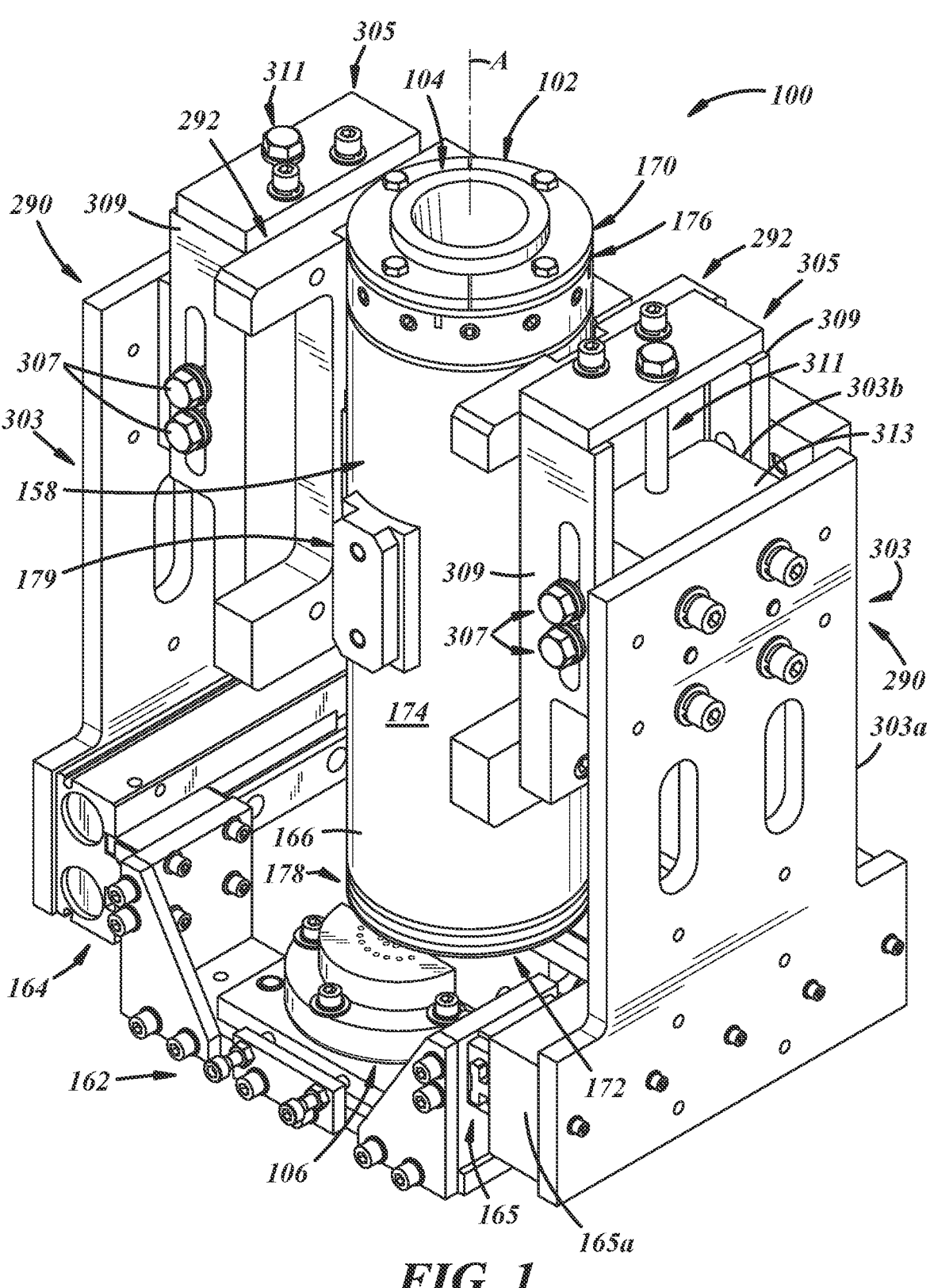
FIG. 1 is an upper perspective view of a molten glass transporter in accordance with an illustrative embodiment of the present disclosure, illustrating a split endcap and endcap carrier in an open position with respect to a conduit and a conduit carrier.

In general, the present disclosure is directed to several embodiments of a unique transport cup used to transport a molten glass charge from a molten glass feeder to a blank mold. The transport cup includes a conduit having an inlet, an outlet, and a passage extending between the inlet and the outlet along a conduit passage axis. The transport cup also includes an endcap to selectively cover and uncover the conduit outlet, and being movable relative to the conduit to a closed position where the endcap covers the conduit outlet to selectively retain a glass charge within the conduit. The endcap is also movable to an open position where the endcap uncovers the conduit outlet to selectively permit the glass charge to exit the conduit. The conduit and/or the endcap may be composed of a material that permits gas to flow diffusively therethrough from an exterior of the transport cup to an interior of the transport cup.

The transport cup further may include one or more fluid supply passages to permit fluid to be introduced into the transport cup to levitate, or at least displace at least a portion of, the glass charge away from the endcap. The fluid supply passages, therefore, space lower axial ends of the charges away from the endcap and, thus, result in more thermally homogeneous charges delivered to molds. Also, some of the fluid supply passages may have interior inlets proximate an interior junction between the endcap and the conduit to displace portions of the charge away from the interior junction. The fluid supply passages, therefore, facilitate avoidance of parting lines formed in the molten glass charge and, thus, facilitate avoidance of carry-through of the parting lines to a finished glass container formed from the molten glass charge. In some implementations, the endcap has a lower end, an upper end, and at least one of the one or more fluid supply passages extending between the lower and upper ends and, in the closed position, at least one of the one or more fluid supply passages is open to the passage of the conduit.

Now with specific reference to the drawing figures, FIGS. 1-6 show a preferred embodiment of a molten glass transporter 100. The transporter 100 is used to transport a discrete portion or charge of molten glass G (FIG. 7) from a molten glass feeder (not shown) to one or more blank molds (not shown) located in any suitable location relative to the feeder, including at elevations above, below, or level with the feeder. Although not illustrated, those of ordinary skill in the art would readily recognize that the feeder may include one or more feeder orifices that dispense molten glass streams and one or more shears, lasers, or the like that separate the molten glass streams into discrete portions or charges of molten glass. The transporter 100 may be translated, rotated, pivoted, swung, articulated, and/or moved in any other manner suitable for transporting a molten glass charge from the molten glass feeder to one or more of the blank molds. Although not illustrated, those of ordinary skill in the art would recognize that a robot, a gantry, rodless cylinder, or any other suitable transporter mover may be used to move the transporter 100. As used herein, permissive terms like "may" and "can" are expedients merely to indicate optionality, for instance, of a disclosed embodiment, element, feature, or the like, and should not be construed as rendering indefinite any disclosure herein.

Figure 2:
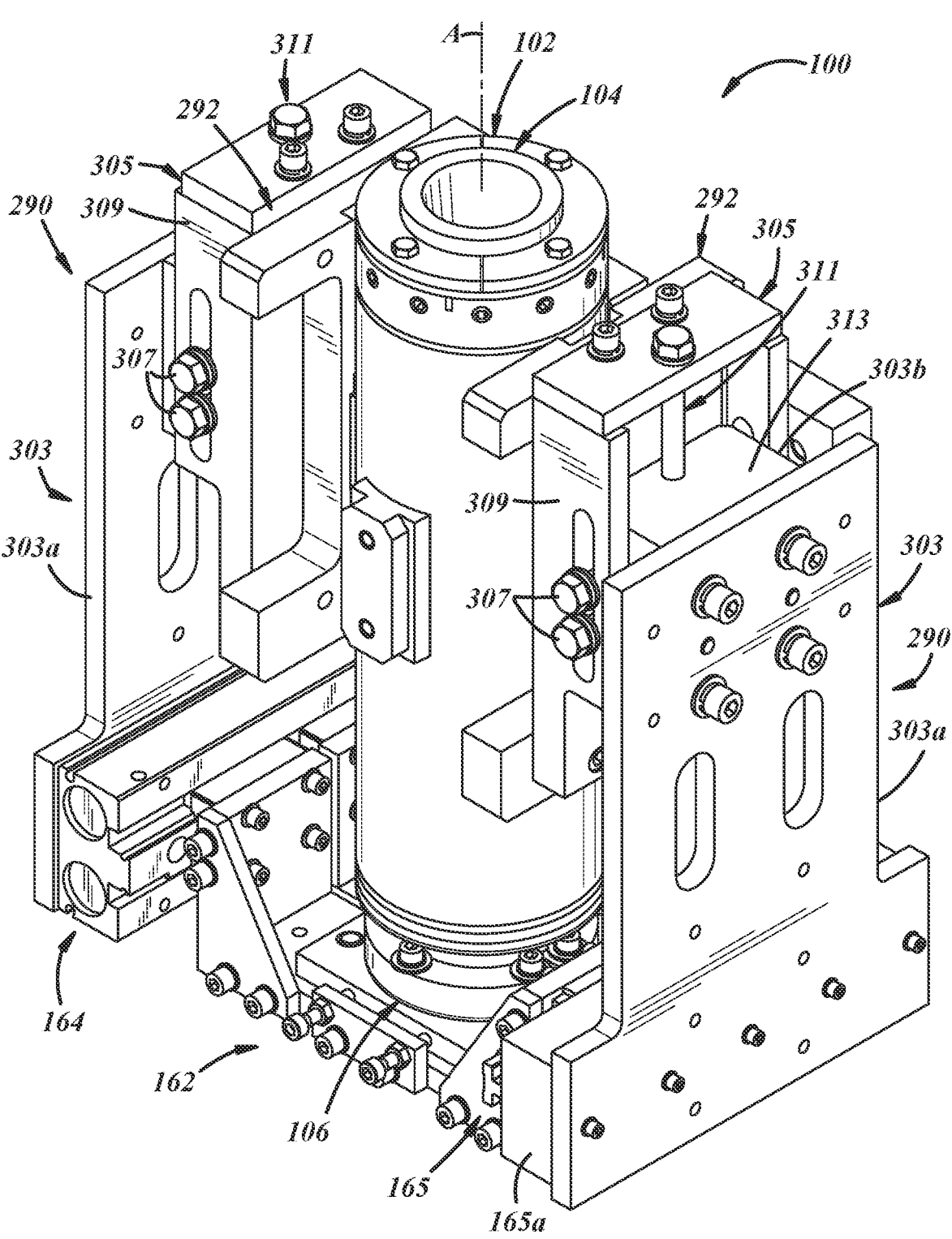
FIG. 2 is an upper perspective view of the molten glass transporter of FIG. 1, illustrating the split endcap and the endcap carrier moved to a closed position with respect to the conduit and the conduit carrier.
Figure 3:
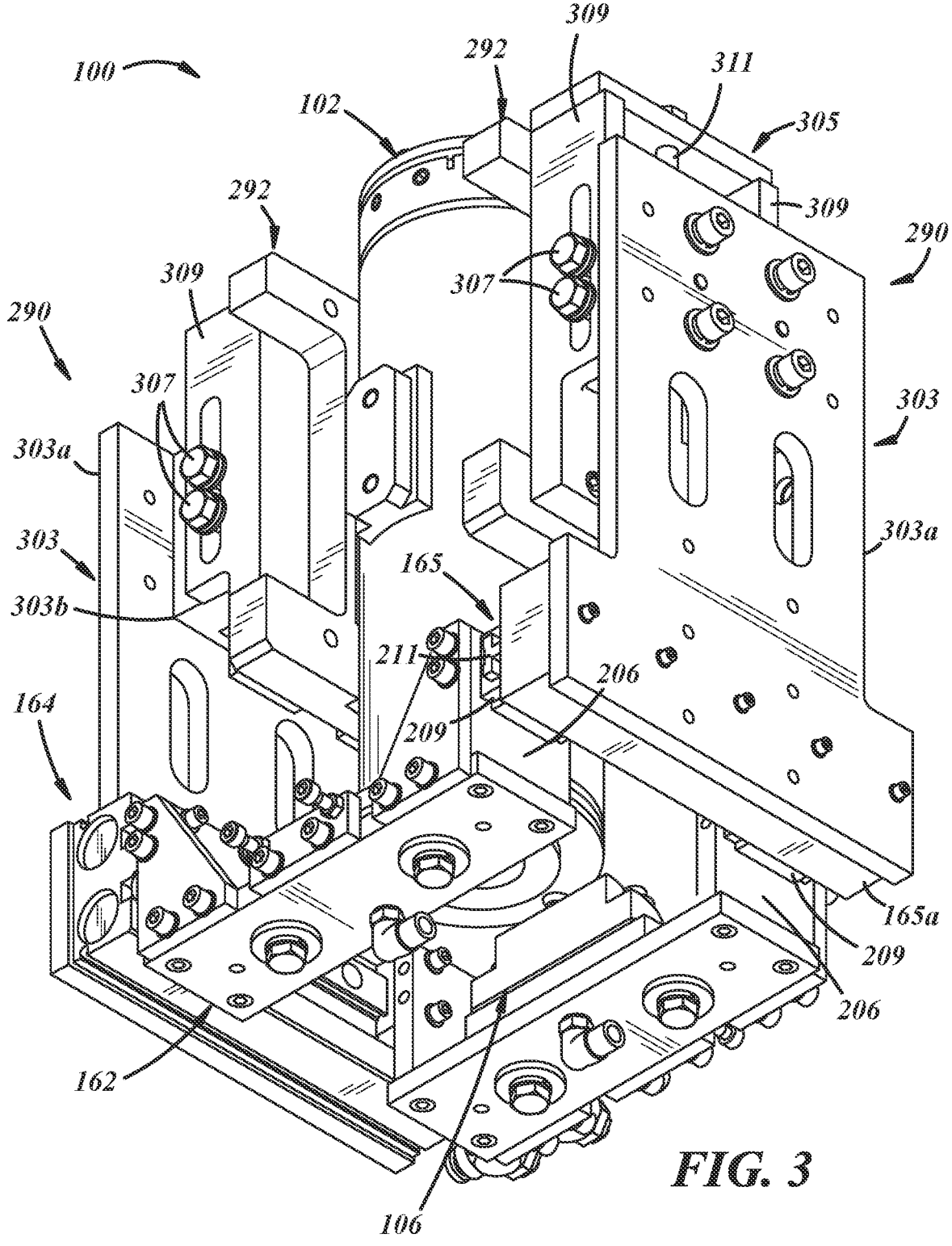
FIG. 3 is a lower perspective view of the molten glass transporter of FIG. 1.
Figure 4:
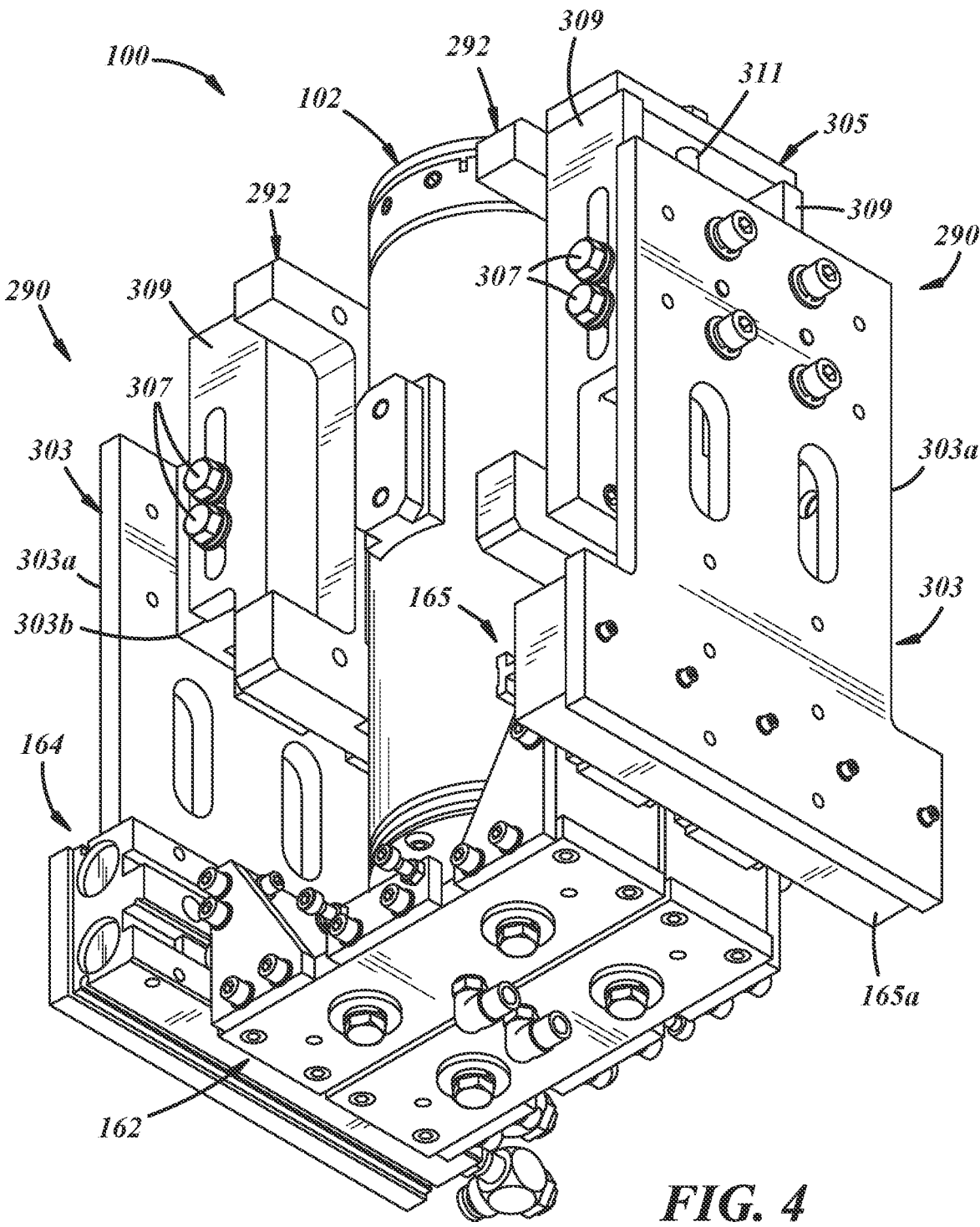
FIG. 4 is a lower perspective view of the molten glass transporter shown in FIG. 2.
Figure 5:
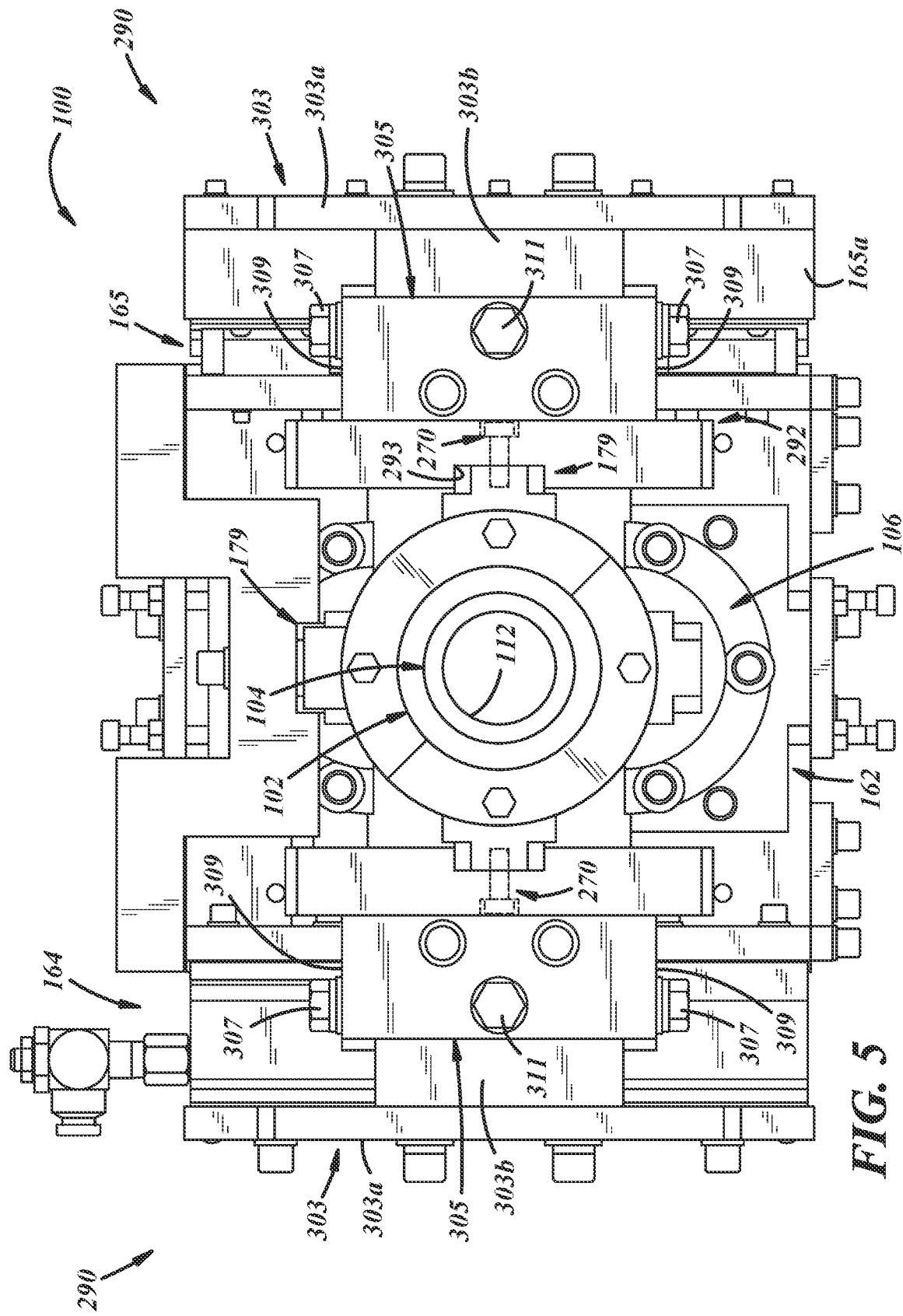
FIG. 5 is a top view of the molten glass transporter of FIG. 1.
Figure 6:
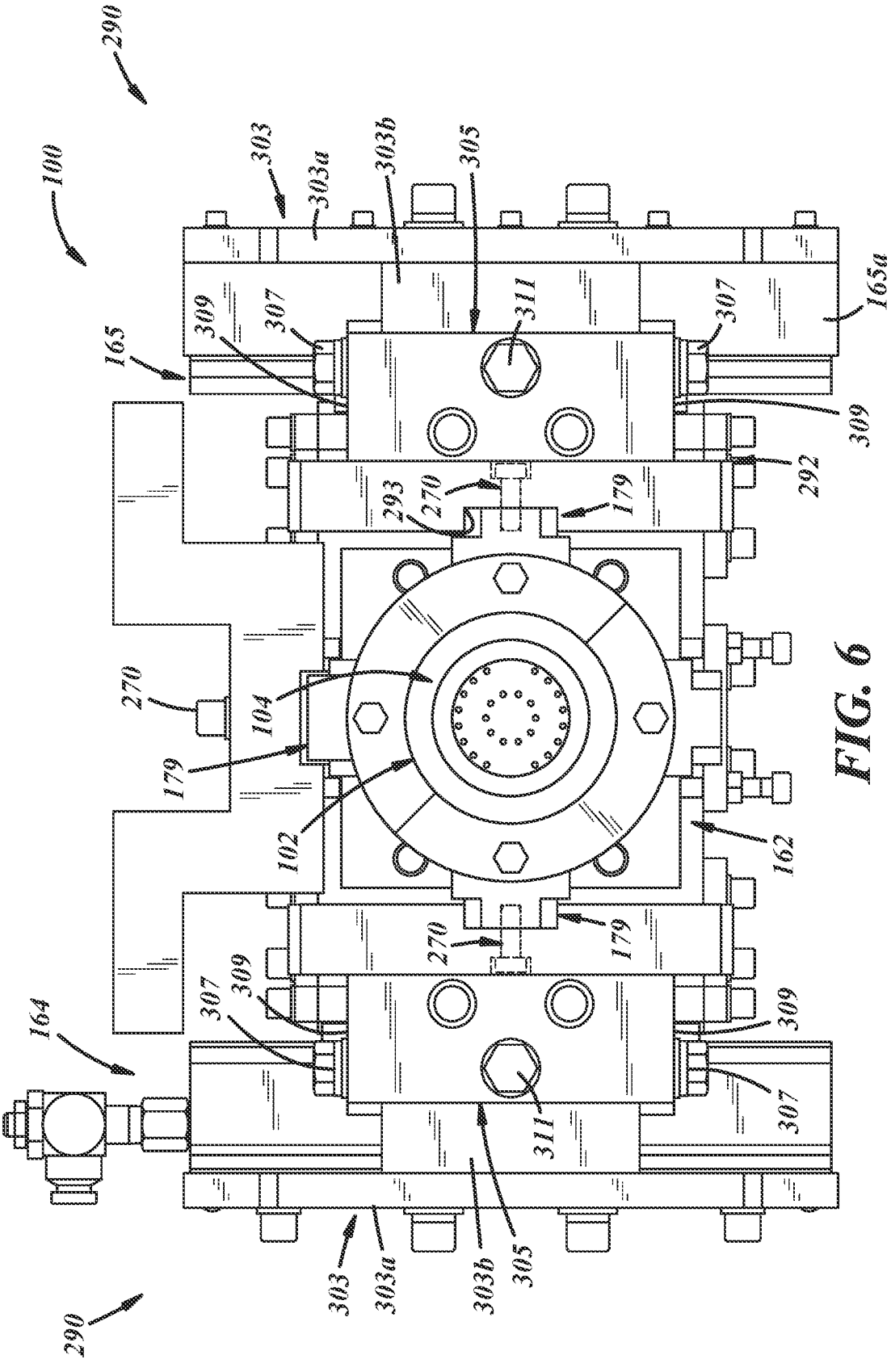
FIG. 6 is a top view of the molten glass transporter shown in FIG. 2.

The transporter 100 includes a transport cup 102 including a conduit 104 to receive a molten glass charge G (FIG. 7), and an endcap 106 that is movable with respect to the conduit 104 to selectively close the conduit 104 to establish a transport cup interior or cavity 108 (FIG. 7) in which the molten glass charge G (FIG. 7) may be carried and to selectively open the conduit 104 to permit the molten glass charge G (FIG. 7) to exit the conduit 104. In an open or dispensing position with respect to the conduit 104, as best shown in FIGS. 1, 3, and 5 the endcap 106 is moved away from the conduit 104, more specifically, away from a central longitudinal axis A of the conduit 104, such that the endcap 106 is spaced from and does not cover or block a conduit outlet 112 (FIG. 5) to allow the molten glass charge G (FIG. 7) to exit the transport cup 102 for delivery into a blank mold (not shown) positioned below the transport cup 102. Conversely, in a closed or transport position with respect to the conduit 104, as best shown in FIGS. 2, 4, and 6, the endcap 106 is moved toward and underneath the conduit 104 and located closely adjacent to the conduit 104 and so that the endcap 106 covers or blocks the conduit outlet 112 (FIG. 5) sufficiently to retain the molten glass charge G (FIG. 7) in the transport cup 102. The conduit 104 may be composed of, for example, graphite, platinum, boron nitride, aluminum nitride, silicon carbide, beryllium oxide, graphene, combinations of the foregoing, or any other material suitable for use in repeated carrying of charges of molten glass, for instance, in a high-volume production environment. In a preferred embodiment, the conduit 104 may be constructed from a material as disclosed in U.S. application Ser. No. 18/113,754, filed on Feb. 24, 2023, the entire contents of which are incorporated herein by reference. The material of the endcap 106 may be the same as the material of the conduit 104 or different therefrom.

Figure 7:
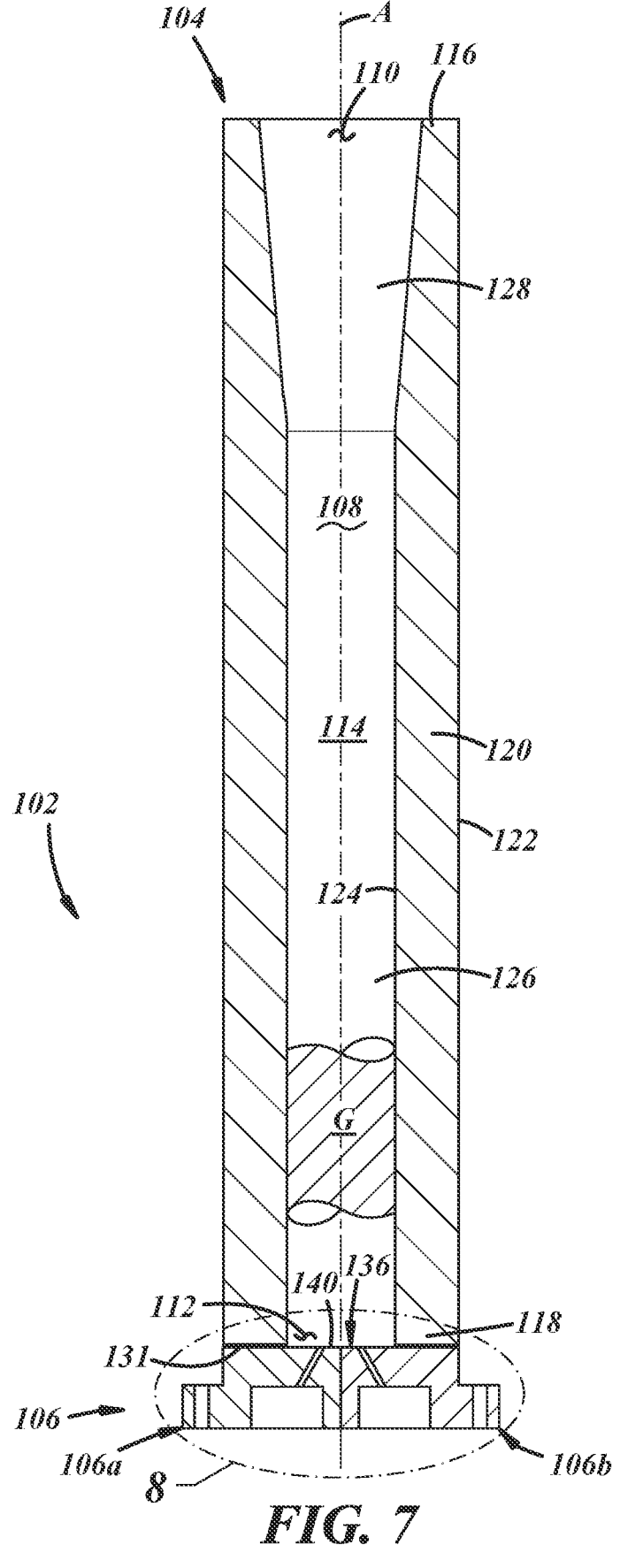
FIG. 7 is an enlarged cross-sectional view of a transport cup of the molten glass transporter of FIG. 1, and including the conduit and the endcap of FIG. 1.

With reference now to FIG. 7, the conduit 104 of the transport cup 102 includes the inlet 110, an outlet 112, and a passage 114 extending between the inlet 110 and the outlet 112 along a conduit passage axis A, which may extend vertically. As used herein, the term "vertically" does not necessarily mean perfectly or absolutely vertical and includes within 0 to +/−2 degrees from absolute vertical including all ranges, subranges, endpoints, and values of that range. The conduit 104 may include an inlet end 116 having the inlet 110, an outlet end 118 having the outlet 112, and a sidewall 120 having an outer surface 122 and an inner surface 124 defining the passage 114 that extends between the inlet 110 and the outlet 112. The molten glass charge G may be in direct contact with the inner surface 124 of the conduit 104 or the glass charge G may be fluidly displaced away from the inner surface 124 as described in more detail below. More specifically, if the molten glass charge G makes contact with the inner surface 124 of the conduit 104, the charge G may be in circumferentially continuous contact with the inner surface 124 of the conduit 104 over at least a portion of a length of the charge G. The inlet 110 and outlet 112 may be coaxial with the conduit passage axis A, as shown in the illustrated embodiment. In other embodiments, one or both the inlet 110 and/or the outlet 112 could be radially offset or inclined with respect to the axis A, such that one or both the inlet 110 and/or the outlet 112 may be located in a sidewall of the conduit 104 between upper and lower ends of the conduit 104, wherein a molten glass charge passage may extend between such an inlet and outlet configuration.

The passage 114 may include a lower portion 126 and an upper tapered portion 128 serving as a funnel to help guide a falling molten glass charge from the inlet 110 down into the lower portion 126 which may have a constant diameter or flow area measured perpendicular to the axis A. Of course, the upper tapered portion 128 would provide the inlet 110 with a larger flow area than that of the outlet 112. The conduit sidewall 120, the conduit 104, and/or the conduit passage 114 may be of circular cylindrical shape, as illustrated, or may be of ovular cylindrical shape, or of any other shape suitable for receiving, carrying, and transporting a charge of molten glass. The inlet end 116 of the conduit 104 may be flat and perpendicular to the conduit passage axis A. As used herein, the term "perpendicular" does not necessarily mean perfectly or absolutely perpendicular or square and includes within 0 to +/−2 degrees from absolute perpendicular including all ranges, subranges, endpoints, and values of that range.

With reference to FIG. 7, the outlet end 118 of the conduit 104 may be square to the longitudinal axis A, such that it may include an end surface 131 extending squarely, radially inwardly from the outer surface 122 of the conduit sidewall 120. The end surface 131 may be a straight surface, as illustrated, but in other embodiments could be crowned or slightly rounded. The conduit 104 may be composed of a heat-resistant material, for example, graphite, platinum, boron nitride, aluminum nitride, silicon carbide, beryllium oxide, graphene, combinations of the foregoing, or any other material suitable for use in repeated carrying of charges of molten glass, for instance, in a high-volume production environment. As used in herein, the terminology "for example," "e.g.," "for instance," "like," "such as," "comprising," "having," "including," and the like, when used with a listing of one or more elements, is to be construed as open-ended, meaning that the listing does not exclude additional elements.

Figure 8:
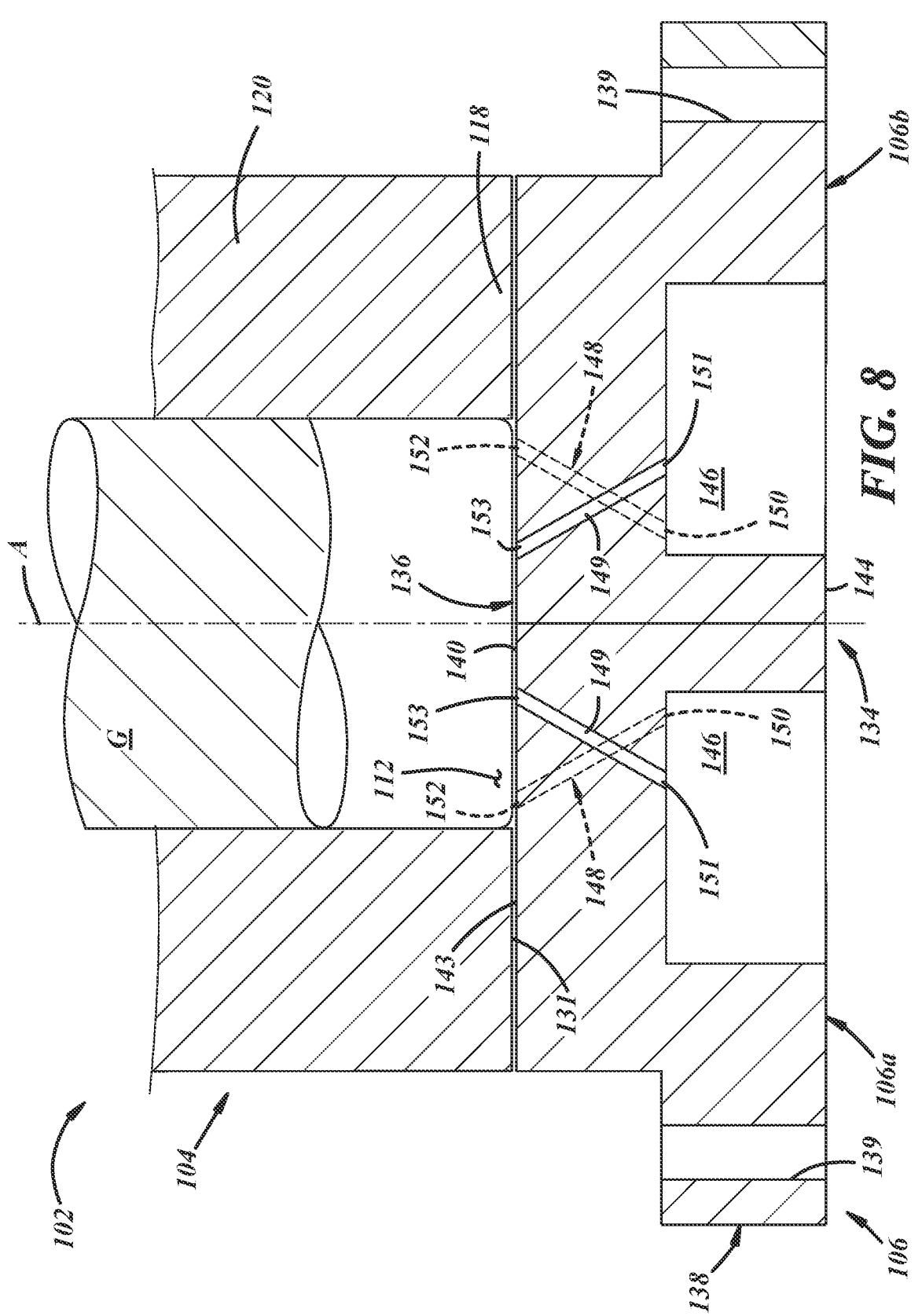
FIG. 8 is an enlarged, fragmentary, cross-sectional view taken from circle 8 of FIG. 7 around a lower portion of the transport cup of FIG. 7 and shown carrying a glass charge.

With reference to FIG. 8, the endcap 106 includes endcap halves 106a, 106b each having a lower end 134, an upper end 136 that may be axially opposite the lower end 134, and a side periphery 138 that extends between the lower and upper ends 134, 136 and that may include mounting reliefs 139, e.g., mounting passages. Each upper end 136 includes a central end surface 140 and may include a marginal end surface 143 extending between the central end surface 140 and the side periphery 138. Each lower end 134 includes a base surface 144 that may be axially opposite the end surface 140 and may include a fluid pocket 146 in the base surface 144. One or both of the end surfaces 140, 143 may be straight surfaces as shown, or may be crowned or slightly rounded surfaces. In this illustrated embodiment, the molten glass charge G is spaced above the end surface 140 of the endcap 106. More specifically, the charge G may be levitated above the end surface 140 of the endcap 106 over the entire diameter of the charge G.

To space the charge G away from the endcap 106, the endcap 106 may include one or more air puff holes or fluid supply passages 148, 149 extending between the lower and upper ends 134, 136. In this embodiment, a first plurality of fluid supply passages 148 may include a first circular array of fluid supply passages 148, and a second plurality of fluid supply passages 149 may include a second circular array of fluid supply passages 149. In other embodiments, the fluid supply passage(s) may include one or more ovular arrays, linear arrays, rectangular arrays, or any other arrangement of fluid supply passages 148 suitable to displace one or more portions of a molten glass charge away from the endcap 106. The fluid supply passages 148, 149 include one or more lower or cup exterior openings 150, 151 open to the fluid pocket 146 of the lower end 134 of the endcap 106, and one or more upper or cup interior openings or inlets 152, 153 open to the central end surface 140 of the upper end 136 of the endcap 106. The pluralities of fluid supply passages 148, 149 may extend through the endcap 106 at one or more oblique angles with respect to the conduit passage axis A. In this embodiment, the one or more oblique angles diverge (passages 148) and converge (passages 149) with respect to the conduit passage axis A in a direction from the lower end 134 toward the upper end 136. In other embodiments, all passages 148, 149 may converge, or all passages 148, 149 may diverge with respect to the conduit passage axis A. In yet other embodiments, one or both of the fluid supply passages 148, 149 may extend orthogonally, for example, parallel to the axis A. In any case, the central end surface 140 has an outer diameter that is smaller than an inner diameter of the outlet 112 of the conduit 104, and the cup interior inlets 152 of the fluid supply passages 148 are radially inward of the inner diameter of the outlet 112.

With continued reference to FIG. 8, the size, quantity, orientation, and/or configuration of the fluid supply passages 148, 149 in addition to the type, flow rate, pressure, and other characteristics of the fluid supplied through the fluid supply passages 148, 149 may be chosen so as to ensure that the fluid supplied into the transport cup 102 between the molten glass charge G and the transport cup 102 is sufficient to displace desired portions of the molten glass charge G but not so large as to eject the molten glass charge G out of the transport cup 102. In a particular example, air may be supplied through the passages 148, 149 at a relatively higher flow rate as the molten glass charge G is loaded into the transport cup 102 and, in contrast, the air may be supplied through the passages 148, 149 at a relatively lower flow rate after the charge G is loaded and the cup 102 travels to the blank molds. In fact, the higher flow rate may prevent the charge G from impacting the endcap 106 during loading of the charge G into the cup 102. Directional words such as front, rear, top, bottom, upper, lower, radial, circumferential, axial, lateral, longitudinal, vertical, horizontal, transverse, and/or the like are employed herein by way of example and not necessarily limitation.

Figure 9:
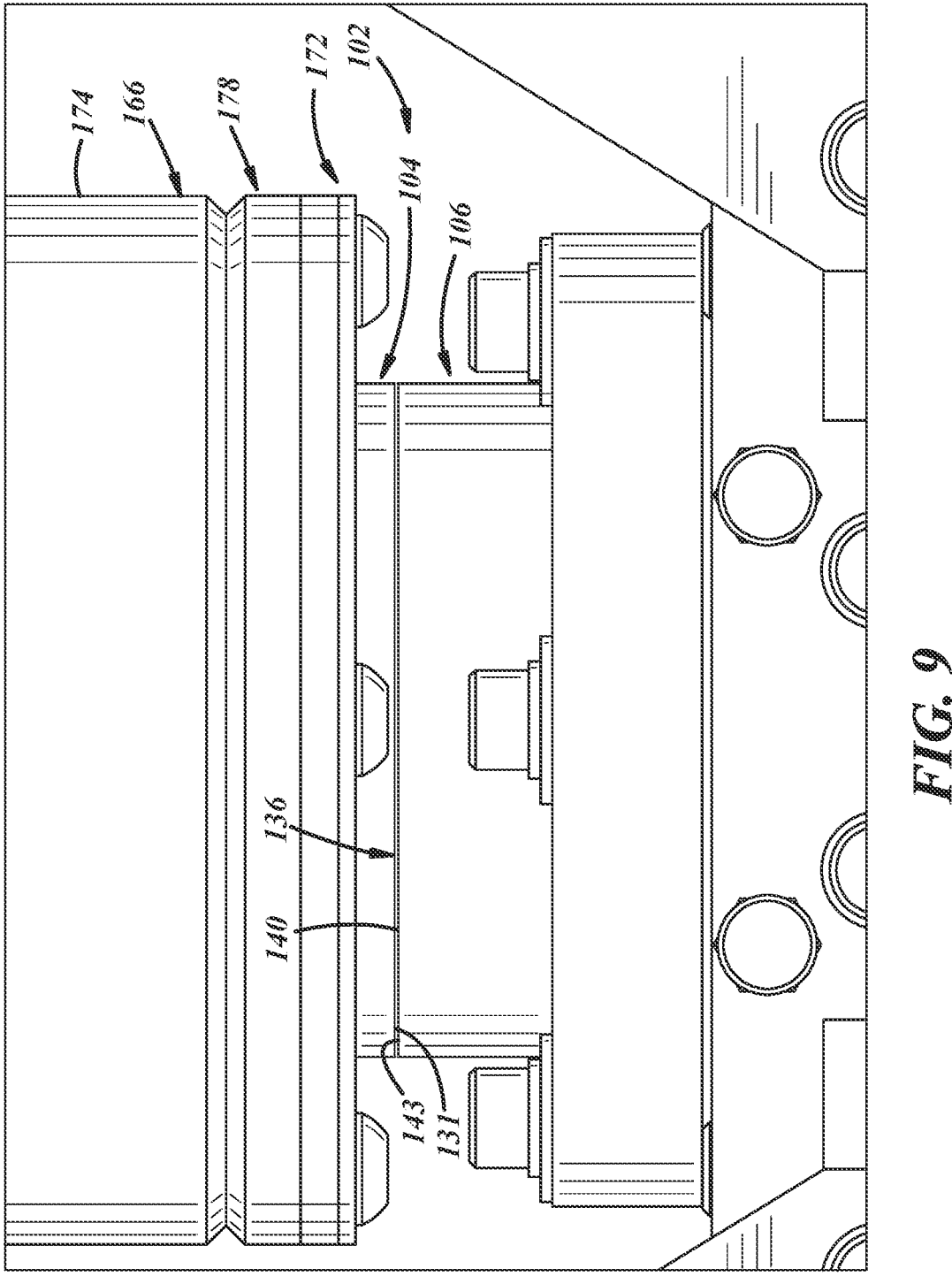
FIG. 9 is an enlarged elevational view of a portion of a transport cup of the molten glass transporter of FIG. 1, showing a lower end of the conduit carrier and the split endcap shown in a closed position.

In the closed position, the upper end 136 of the endcap 106 is located at the outlet end 118 of the conduit 104, and the molten glass charge G is retained in the conduit passage 114 by the endcap 106 at the outlet end 118 of the conduit 104 and closes the outlet 112. The upper end 136 of the endcap 106 and the outlet end 118 of the conduit 104 have cooperating corresponding surfaces. More particularly, with reference to FIGS. 8 and 9, in this illustrated embodiment, the marginal end surface 143 of the upper end 136 of the endcap 106 is spaced away from the end surface 131 of the outlet end 118 of the conduit 104 with an axial gap therebetween to establish an exhaust or vent path out of the cup 102. In such embodiments, the axial gap may be 0.003" to 0.030" including all ranges, subranges, endpoints, and values of that range. In other embodiments, one or more exhaust reliefs (not shown) may be provided in one or the other or both of the surfaces 131, 143 to allow gas to escape therethrough to atmosphere or elsewhere. For example, the end surfaces 131, 143 instead may be in direct contact, wherein one or both of the end surfaces 131, 143 have one or more exhaust channels formed therein to allow fluid to escape.

With continued reference to FIG. 8, fluid is supplied through the fluid supply passage(s) 148, 149 and the fluid may include pressurized gas, for example, air, cooled air, heated air, humidified air, dehumidified air, oxygen, nitrogen, or any other gas suitable for contact with molten glass. Although not illustrated, those of ordinary skill in the art would recognize that the pressurized gas may be provided from a vessel pressurized with the gas, a gas line pressurized by a pump, or any other suitable source of pressurized gas, and a flow rate of the pressurized gas may be controlled by one or more proportional valves or the like or in any other suitable matter. Without fluid supplied through the fluid supply passage(s) 148, 149 of the endcap 106, the molten glass charge G would engage a junction between the endcap 106 and the conduit 104, and/or a junction between the endcap halves 106a,b, which junctions would form one or more parting lines in the molten glass charge G. In at least some implementations, when the endcap 106 covers the conduit 104 such that the fluid supply passages 148, 149 are in communication with the transport cup 102, fluid is conveyed into the transport cup 102 to displace at least portions of the molten glass charge G away from the junctions.

The cup interior inlets 152 may have diameters of, for example, 0.5 to 2 mm, including all ranges, subranges, endpoints, and values of that range. Those of ordinary skill in the art would understand from the disclosure and teachings herein that the individual and collective surface areas of the inlets 152, and of any exhaust outlet or vent gaps or reliefs (not shown), may be selected so as to achieve a desired total air mass flow into, through, and out of the transport cup 102 that results in a desired amount of displacement of the molten glass charge G.

Also, the fluid is supplied between the transport cup 102 and the molten glass charge G to levitate the molten glass charge G away from the endcap 106 and create a gap between the endcap 106 and a lower end of the molten glass charge G. Therefore, the molten glass charge G does not contact the endcap 106 and, thus, formation of cold spots and parting lines is avoided. The fluid supply passages 148, 149 therefore, facilitate avoidance or reduction of cold spots and/or parting lines formed in the molten glass charge G and, thus, facilitate avoidance or reduction of carry-through of the cold spots and/or parting lines to a finished glass container formed from the molten glass charge G.

With reference again to FIG. 1, the transporter 100 also may include a conduit carrier 158 in which the conduit 104 is carried. Additionally, the transporter 100 may include an endcap carrier 162 on which the endcap 106 is carried, and an endcap actuator 164 and endcap guide 165 coupled to the endcap carrier 162 and activatable to move and guide the endcap 106 to uncover and to cover the outlet 112 of the conduit 104. The actuator 164 may be or may include a linear rodless cylinder and may be pneumatic or hydraulic, or may include an electric device such as a linear motor, a rotary motor with a drive screw, a solenoid, or any other arrangement suitable to cause linear movement. The actuators 164 may be activated to linearly displace the halves 106a,b of the split endcap 106 laterally and out of the way of the outlet end 118 of the conduit 104. Of course, the actuators 164 may be activated in reverse, to linearly displace the halves 106a,b of the endcap 106 laterally back toward and directly under the conduit 104, and to displace the endcap 106 linearly back to the outlet end 118 of the conduit 104.

Figure 10:
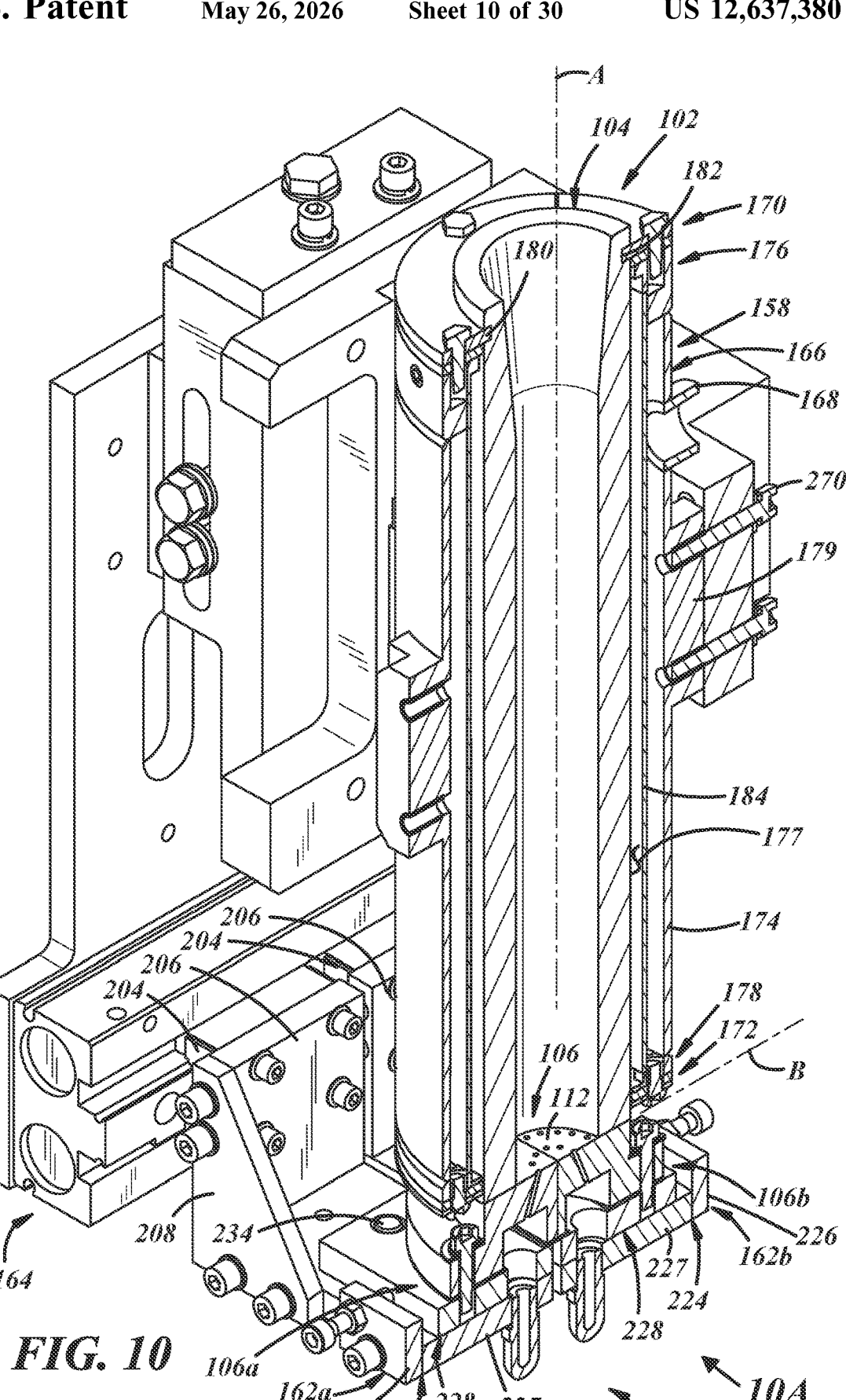
FIG. 10 is an enlarged cross-sectional perspective view of a transport cup of the molten glass transporter of FIG. 1, showing the conduit, the conduit carrier, the split endcap, and the endcap carrier.

With reference to FIG. 10, the conduit carrier 158 may include a vertically extending oblong sleeve 166 that may be radially spaced from the conduit 104, and may be supplied with gas via a gas inlet 168 that may be in fluid communication with a gas supply. The gas may be cooling gas (for example, at a temperature ranging from 0° C. to 100° C. or, more narrowly, from 10° C. to 50° C.) to cool an exterior of the conduit 104, and may also be pressurized to facilitate diffuse flow of gas from the exterior of the conduit 104, through the conduit 104, to an interior of the conduit 104. Here, the gas may include air, oxygen, nitrogen, or any other gas suitable for contact with molten glass, and may be provided from a vessel pressurized with the gas, a gas line pressurized by a pump, or any other suitable source of the gas, and a flow rate of the gas may controlled by one or more proportional valves or the like or in any other suitable matter. In one example, the gas may be supplied to the conduit 104 at a pressure between 1 and 100 psi, including all ranges, sub-ranges, values, and endpoints of that range. The conduit carrier 158 also may include upper and lower mounting rings 170, 172 that are coupled to the conduit carrier 158 and engaged to corresponding portions of the conduit 104 as will be described in greater detail below. The sleeve 166 may include a tubular body 174 and upper and lower caps 176, 178 that may be fastened, welded, threaded, or otherwise coupled to corresponding ends of the tubular body 174 to establish a gas volume 177 between the sleeve 166 and the conduit 104.

The upper mounting ring 170 may be fastened, welded, threaded, or otherwise coupled to the upper cap 176 of the sleeve 166 and may have one or more radially inwardly extending tongues 180 that fit into one or more corresponding grooves 182 in the conduit 104. To facilitate assembly of such a tongue-and-groove connection, the upper mounting ring 170 may be split, and constituted from semi-circumferential halves. The lower mounting ring 172 and mounting arrangement to the conduit 104 may be similar to that of the upper mounting ring 170.

The conduit carrier 158 also may include a baffle 184 located radially between the sleeve 166 and the conduit 104 to direct gas supplied through the conduit carrier 158 to the conduit 104. Portions of the baffle 184 may be welded, fastened, interference fit, or otherwise coupled to corresponding portions of the sleeve 166. The baffle 184 may establish a circuitous path for a supply of gas to the conduit 104. More specifically, gas enters the conduit carrier 158 via the gas inlet 168, flows circumferentially around the baffle 184 and down to a lower end of the baffle 184 that has holes, reliefs, or at least some portions axially spaced from corresponding portions of the sleeve 166 of the conduit carrier 158. The gas flows through the holes or reliefs or around the lower end of the baffle 184, radially inwardly toward the conduit 104, and circumferentially around the conduit 104 between the conduit 104 and the baffle 184 and up and out of one or more gas outlets (not shown). The baffle 184 promotes more uniform impingement of the cooling gas circumferentially over the entire outer surface 122 of the conduit 104 and allows for the pressure differential across the conduit 104 between the outer surface 122 and the inner surface 124 to be more uniform, thus helping produce more uniform permeable cooling gas flow through the conduit 104 along the length of the conduit 104.

Instead or additionally, the gas may flow diffusively through the conduit 104 to the interior of the conduit 104 when the conduit 104 is composed of a material that permits diffusive flow of gas therethrough. The gas creates a positive pressure differential between the gas volume 177 and transport cup cavity 108, which drives flow of the gas through the sidewall 120 of the conduit 104 via diffusion. The baffle 184, with or without, gas exhaust outlets (not shown), promotes both a uniform gas flow rate over the entire outer surface 122 of the sidewall 120 of the conduit 104 and allows for the pressure differential to be uniform around and across the outer surface 122, producing uniform diffuse flow through the sidewall 120 along the length of the conduit 104.

With continued reference to FIG. 10, the endcap carrier 162 includes outer holders 224 having sidewalls 226 and lower walls 227 coupled to the sidewalls 226 for example, via the illustrated cap screws, any other suitable fasteners, welding, or any other suitable mounting arrangement. The endcap carrier 162 also includes inner mounting blocks 228 carried by the outer holders 224 and to which the endcap halves 106a,b may be coupled via the illustrated cap screws, any other suitable fasteners, welding, or any other suitable mounting arrangement. The transporter 100 also may include actuator mounting plates 206 mounted to actuator armatures 204 of the actuator 164, for example, via the illustrated cap screws, any other suitable fasteners, welding, or any other suitable mounting arrangement. Likewise, the transporter 100 further may include gusset brackets 208 mounted to the mounting plates 206 and to the lower walls 227 of the endcap carrier 162, via the illustrated cap screws, any other suitable fasteners, welding, or any other suitable mounting arrangement. Those of ordinary skill in the art would recognize that the endcap carrier 162 may be coupled to the actuator 164 in any other suitable manner. With reference again to FIG. 3, the endcap guide 165 may include a linear bushing or bearing arrangement, for example, pillow blocks 209 fixed to the mounting plates 206 in any suitable manner and translatably coupled to rails 211.

Figure 10A:
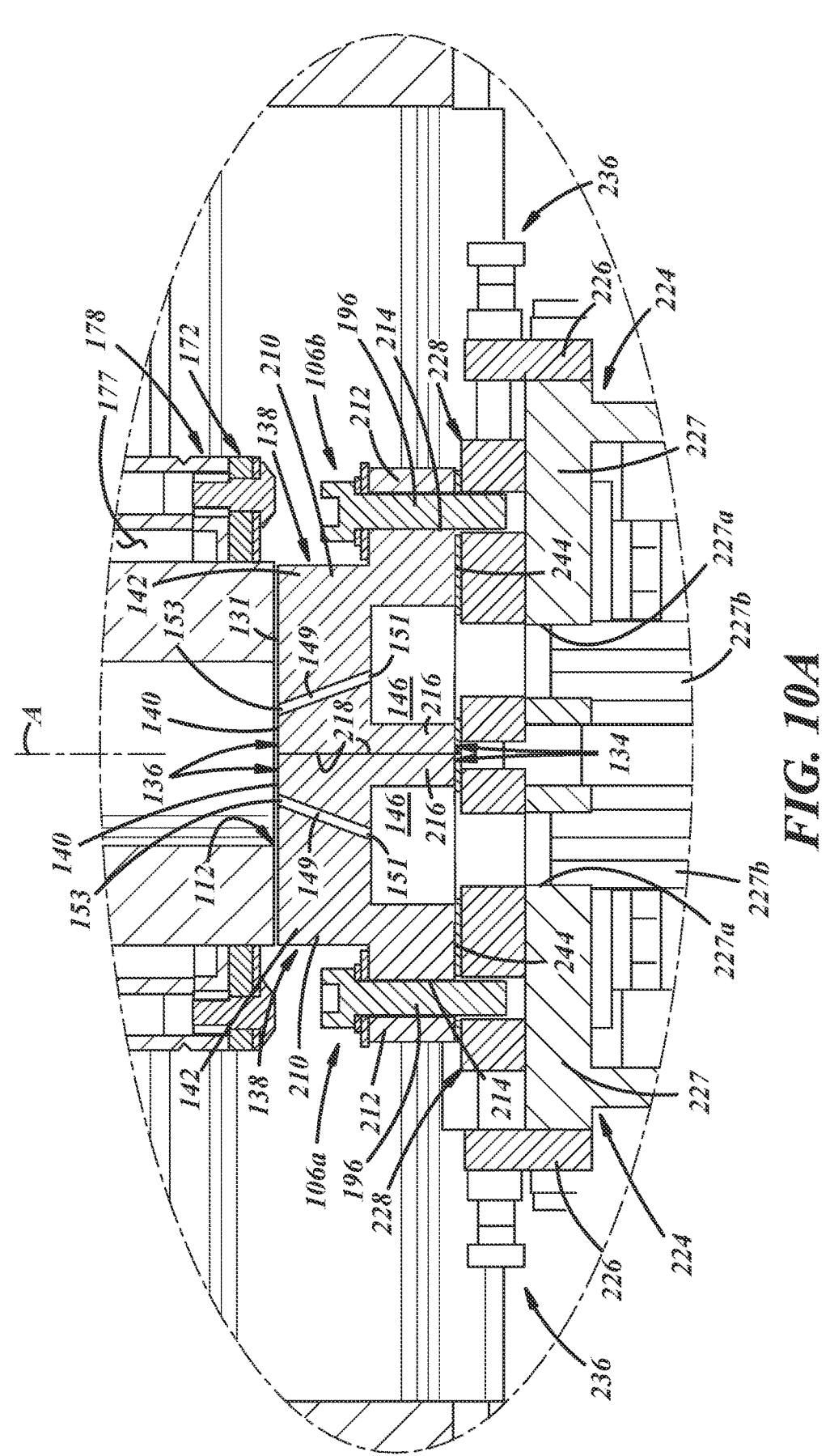
FIG. 10A is a further enlarged, fragmentary, cross-sectional, elevational view of a lower portion of the transport cup shown in FIG. 10, taken along line 10A of FIG. 10.

With reference now to FIG. 10A, the endcap halves 106a,b may include radially outwardly facing shoulders 210, mounting flanges 212, and fastener passages 214 extending through the mounting flanges 212 to accept fasteners 196 that fasten the halves 106a,b to the mounting blocks 228. The endcap halves 106a,b may include facing walls 216 having diametric mating surfaces 218 that may contact one another when the endcap 106 is in the closed or transport position. Also, the lower walls 227 of the holders 224 may be oblong plates extending perpendicularly with respect to the open/close axis B of the split endcap 106, and the sidewalls 226 of the holders 224 may include discrete plates fastened to sides of the oblong plates. In any case, the lower walls 227 have gas ports 227a therein that are coupled to gas fittings 227b, for example, via threaded connections. The endcap carrier halves 162a,b further may include apertured gaskets 244 between the mounting blocks 228 and the endcap halves 106a,b. Those of ordinary skill in the art would recognize that the mounting blocks 228 may be movably fastened to the lower walls 227 of the outer holders 224 by fasteners 234 (FIG. 10) having threaded ends threaded into corresponding threaded holes in the inner mounting blocks 228, shanks extending through enlarged holes in the lower walls 227 of the outer holders 224, and heads trapping washers to the lower walls 227 of the outer holders 224. Also, positions of the inner mounting blocks 228 may be finely adjusted by set screws 236 extending through the sidewalls 226 of the outer holders 224 and engaged to the inner mounting blocks 228. Those of ordinary skill in the art would recognize that the fasteners 234 can be loosened, the set screws 236 turned, the inner mounting blocks 228 moved to desired positions, and the fasteners 234 tightened to lock the inner mounting blocks 228 in their desired positions to ensure a desired location of the endcap halves 106*a,b* relative to one another and/or to the conduit 104.

With reference again to FIGS. 1-6, the transporter 100 further may include an adjustable endcap mounting frame 290 that adjustably mounts the endcap carrier 162 to the conduit carrier 158. The mounting frame 290 may include adapter plates 292 coupled to the sleeve 166 of the conduit carrier 158. The conduit carrier 158 includes mounting bosses 179 that may be oblong, may fit into corresponding oblong reliefs 293 (FIGS. 5 and 6) in inboard surfaces of the plates 292, and may be fastened to the plates 292 by fasteners 270 (FIGS. 5 and 6) extending through the plates 292 and into threaded passages in the oblong bosses 179. Those of ordinary skill in the art would recognize that the conduit carrier 158 may be coupled to the frame adapter plates 292 by dovetail integral engagement or other mechanical mounting arrangements, or via welding, or in any other suitable manner.

Also, the frame 290 may include endcap carrier extensions 303 having lower ends coupled to the endcap actuator 164, and to the endcap guide 165 via an adapter block 165*a*, and a corresponding carrier extension 305 coupled to and extending outward from the adapter plates 292. Those of ordinary skill in the art would recognize that the illustrated endcap carrier extension 303 includes a plate 303*a* carrying the endcap guide adapter block 165*a* at a lower end via cap screws fastened through the plate 303*a* and into the block 165*a*, and a guide block 303*b* fastened to an upper end of the plate 303*a* via cap screws extending through the plate 303*a* and into the guide block 303*b*. The conduit carrier extension 305 may be fastened to the adapter plates 292 by cap screws, or may be fastened or otherwise coupled thereto in any other suitable manner. One or more fasteners 307 may extend through slots in sidewalls 309 of the conduit carrier extension 305 and into one or more corresponding threaded holes in the endcap carrier extensions 303. Set screws 311 may extend through end walls of the conduit carrier extension 305 and into corresponding threaded passages in an upper wall 313 of the endcap carrier extensions 303. Those of ordinary skill in the art would recognize that the fasteners 307 can be loosened, the set screw 311 turned, the extension 303 and the rest of the endcap carrier extension 303 moved to a desired position, and the fasteners 307 tightened to lock the endcap carrier extension 303 in a desired position relative to the conduit carrier extension 305 to ensure desired location of the endcap 106 relative to the conduit 104.

Although not illustrated, those of ordinary skill in the art would recognize that the transporter 100 can be adapted for use with any suitable electrical, hydraulic, and/or pneumatic fittings, lines, adapters, valves, and the like, and can be coupled to any suitable source of electrical, hydraulic, and/or pneumatic power, to power the actuator, supply gas into the transport cup 102, and to supply gas to the conduit carrier 158. Likewise, those of ordinary skill in the art would recognize that any suitable controllers and controls can be employed to control the operation of the transporter 100.

FIGS. 11-17 show another illustrative embodiment of a molten glass transporter 300. This embodiment is similar in many respects to the embodiments of FIGS. 1-10A and like numerals among the embodiments generally designate like or corresponding elements throughout the several views of the drawing figures. Accordingly, the descriptions of the embodiments are incorporated into one another, and description of subject matter common to the embodiments generally may not be repeated here.

With reference to FIGS. 11-14, the transporter 300 is used to transport a discrete portion or charge of molten glass G (FIG. 14) from a molten glass feeder F (FIG. 12) to one or more blank molds M (FIG. 11) located in any suitable location relative to the feeder F, including at elevations above, below, or level with the feeder F. The feeder F may include one or more feeder orifices (not shown) that dispense molten glass streams (not shown) and one or more shears (not shown) that shear the molten glass streams into discrete portions or charges of molten glass. The transporter 300 may be translated, rotated, pivoted, swung, articulated, and/or moved in any other manner suitable for transporting a molten glass charge from the molten glass feeder F to one or more of the blank molds M. Although not illustrated, those of ordinary skill in the art would recognize that a robot, a gantry, or any other suitable transporter mover may be used to move the transporter 300.

Figures 11, 12:
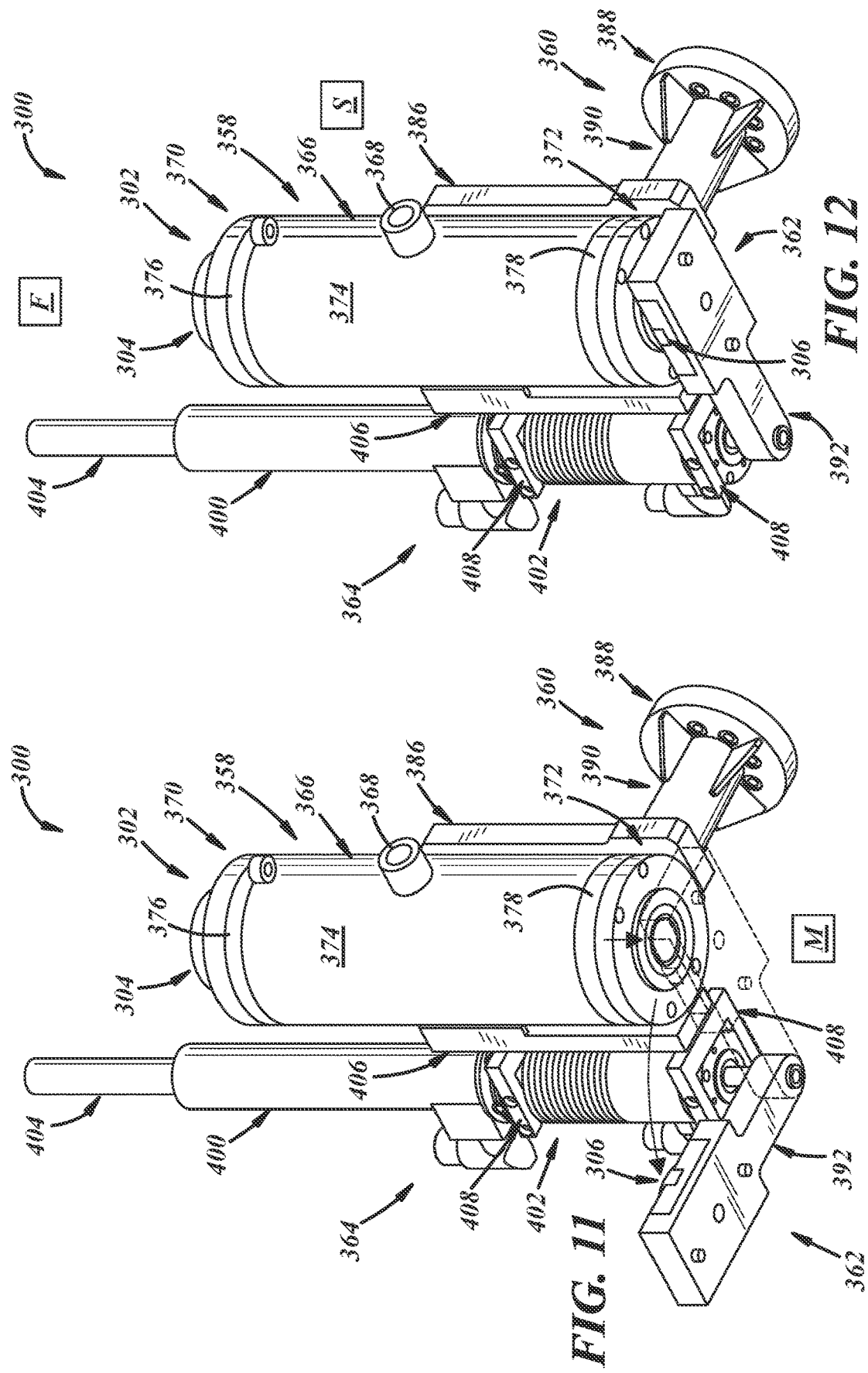
FIG. 11 is a perspective view of a molten glass transporter in accordance with an illustrative embodiment of the present disclosure, showing a transport cup including a conduit and an endcap, and also showing a conduit carrier carrying the conduit and an endcap carrier carrying the endcap and in an open position with respect to the conduit carrier.
FIG. 12 is a perspective view of the molten glass transporter of FIG. 11, illustrating the endcap and endcap carrier moved to a closed position with respect to the conduit carrier.
Figure 13:
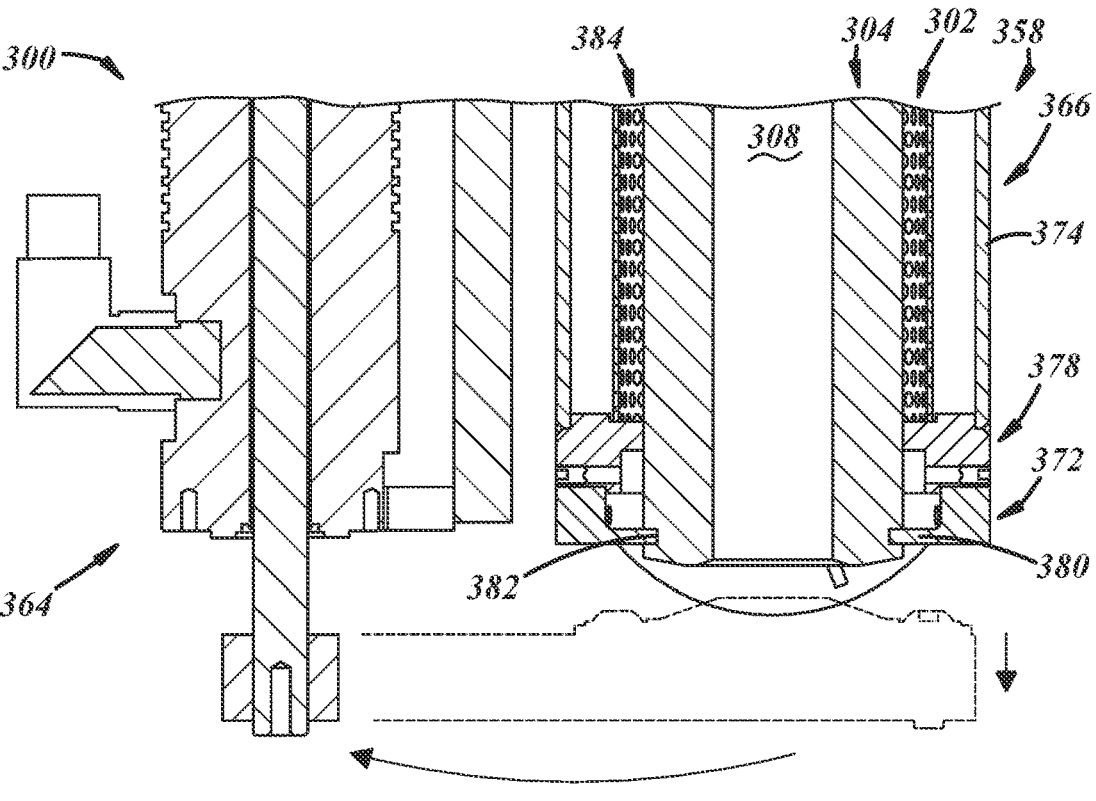
FIG. 13 is an enlarged, fragmentary, cross-sectional view of a lower portion of the molten glass transporter of FIG. 11.
Figure 14:
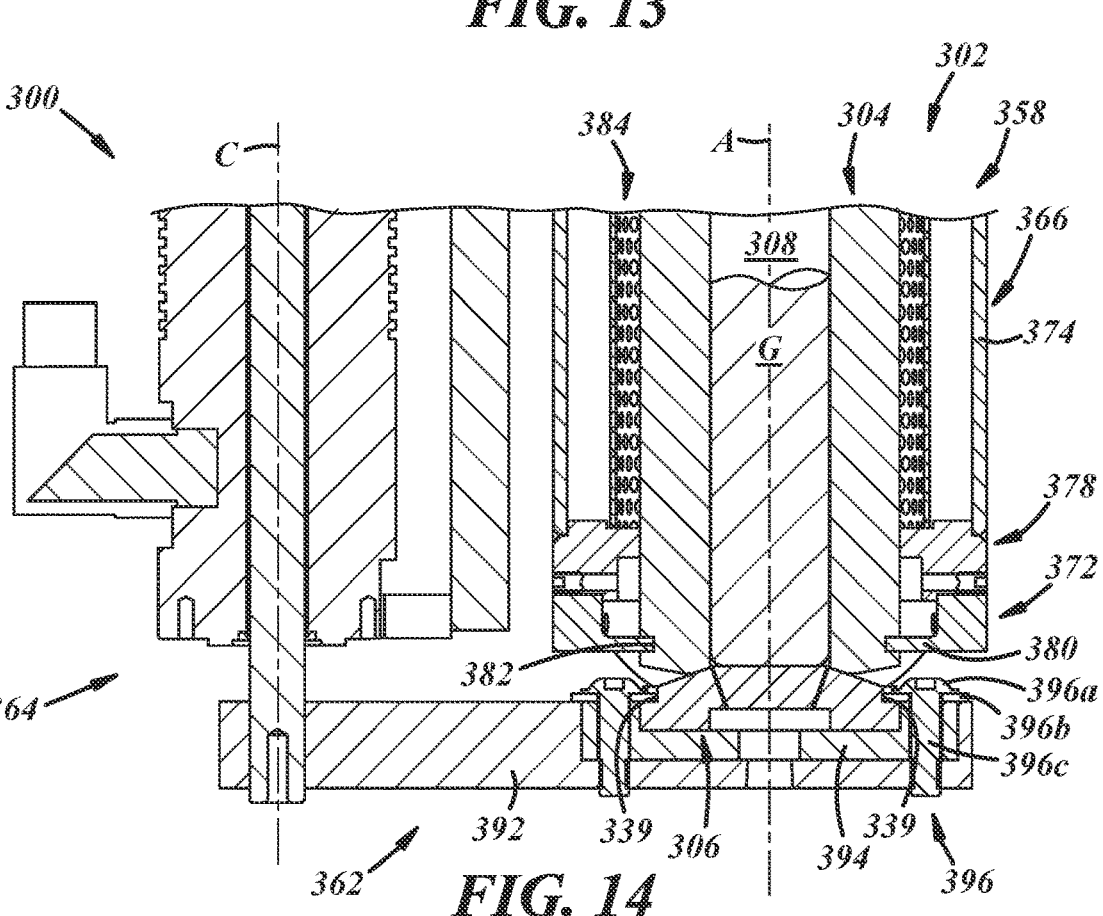
FIG. 14 is an enlarged, fragmentary, cross-sectional view of the lower portion of the molten glass transporter of FIG. 12.

The transporter 300 includes a transport cup 302 including a conduit 304 to receive a molten glass charge, and an endcap 306 that is movable with respect to the conduit 304 to selectively close the conduit 304 to establish a transport cup interior or cavity 308 (FIG. 14) in which the molten glass charge G (FIG. 14) may be carried and to selectively open the conduit 304 to permit the molten glass charge G to exit the conduit 304. In an open or dispensing position with respect to the conduit 304, as best shown in FIGS. 11 and 13, the endcap 306 is moved away from the conduit 304 to allow the molten glass charge G to exit the transport cup 302 for delivery into the blank mold M (FIG. 11) positioned below the transport cup 302. In a closed or transport position with respect to the conduit 304, as best shown in FIGS. 12 and 14, the endcap 306 is moved toward and underneath the conduit 304 to retain the molten glass charge in the transport cup 302.

Figures 15, 16:
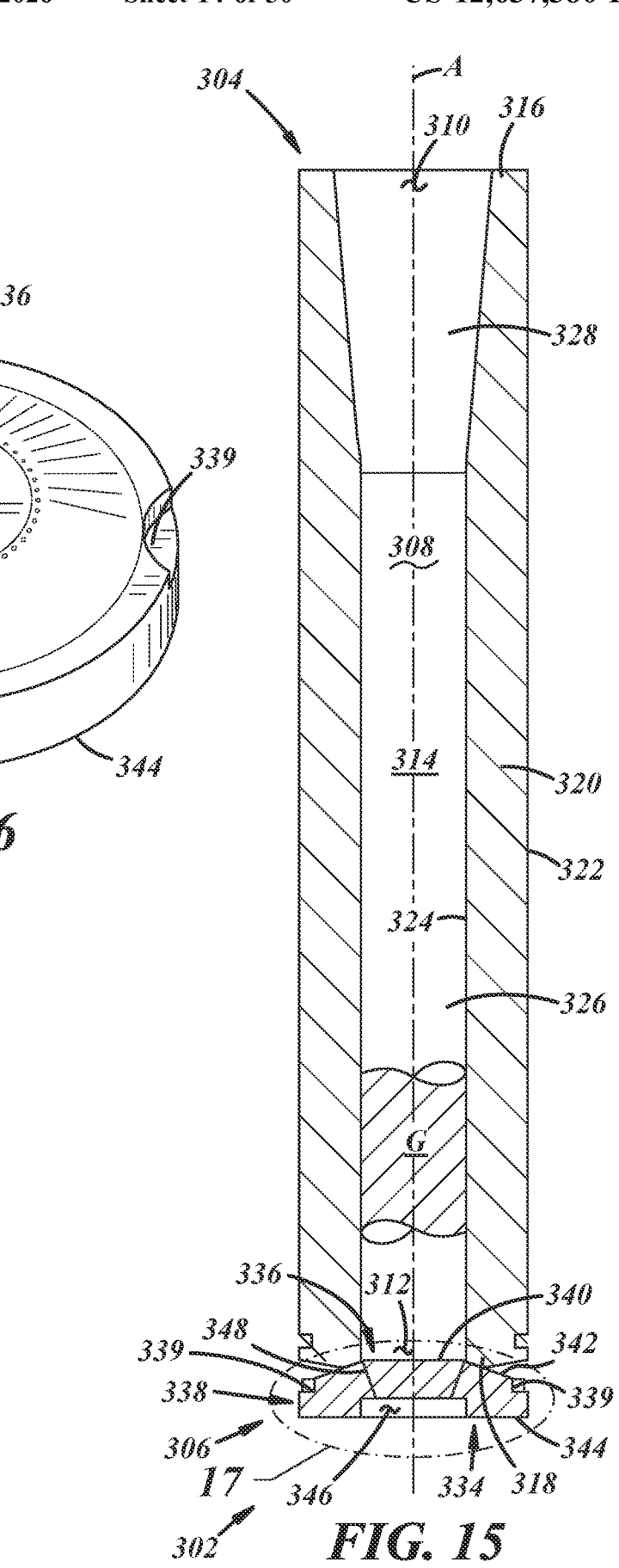
FIG. 15 is an enlarged cross-sectional view of a transport cup of the molten glass transporter of FIG. 11, and including the conduit and the endcap of FIG. 11.
FIG. 16 is an enlarged perspective view of the endcap of FIG. 11.

With reference to FIG. 15, the conduit 304 of the transport cup 302 includes an inlet 310, an outlet 312, and a passage 314 extending between the inlet 310 and the outlet 312 along a conduit passage axis A, which may extend vertically. As used herein, the term "vertically" does not necessarily mean perfectly or absolutely vertical and includes within 0 to +/−2 degrees from absolute vertical including all ranges, subranges, endpoints, and values of that range. The conduit 304 may include an inlet end 316 having the inlet 310, an outlet end 318 having the outlet 312, and a sidewall 320 having an outer surface 322 and an inner surface 324 defining the passage 314 that extends between the inlet 310 and the outlet 312. The molten glass charge G may be in direct contact with the inner surface 324 of the conduit 304 or the glass charge G may be fluidly displaced away from the inner surface 324 as before. The inlet 310 and outlet 312 may be coaxial with the conduit passage axis A, as shown in the illustrated embodiment. In other embodiments, one or both the inlet 310 and/or the outlet 312 could be radially offset or inclined with respect to the axis A, such that one or both the inlet 310 and/or the outlet 312 may be located in a sidewall of the conduit 304 between upper and lower ends of the conduit 304, wherein a molten glass charge passage may extend between such an inlet and outlet configuration.

The passage 314 may include a lower portion 326 and an upper tapered portion 328 serving as a funnel to help guide a falling molten glass charge from the inlet 310 down into the lower portion 326 which may have a constant diameter or flow area measured perpendicular to the axis A. Of course, the upper tapered portion 328 would provide an inlet 310 having a larger flow area than that of the outlet 312. The conduit sidewall 320, the conduit 304, and/or the conduit passage 314 may be of circular cylindrical shape, as illustrated, or may be of ovular cylindrical shape, or of any other shape suitable for receiving, carrying, and transporting a charge of molten glass. The inlet end 316 of the conduit 304 may be flat and perpendicular to the conduit passage axis A.

Figure 17:
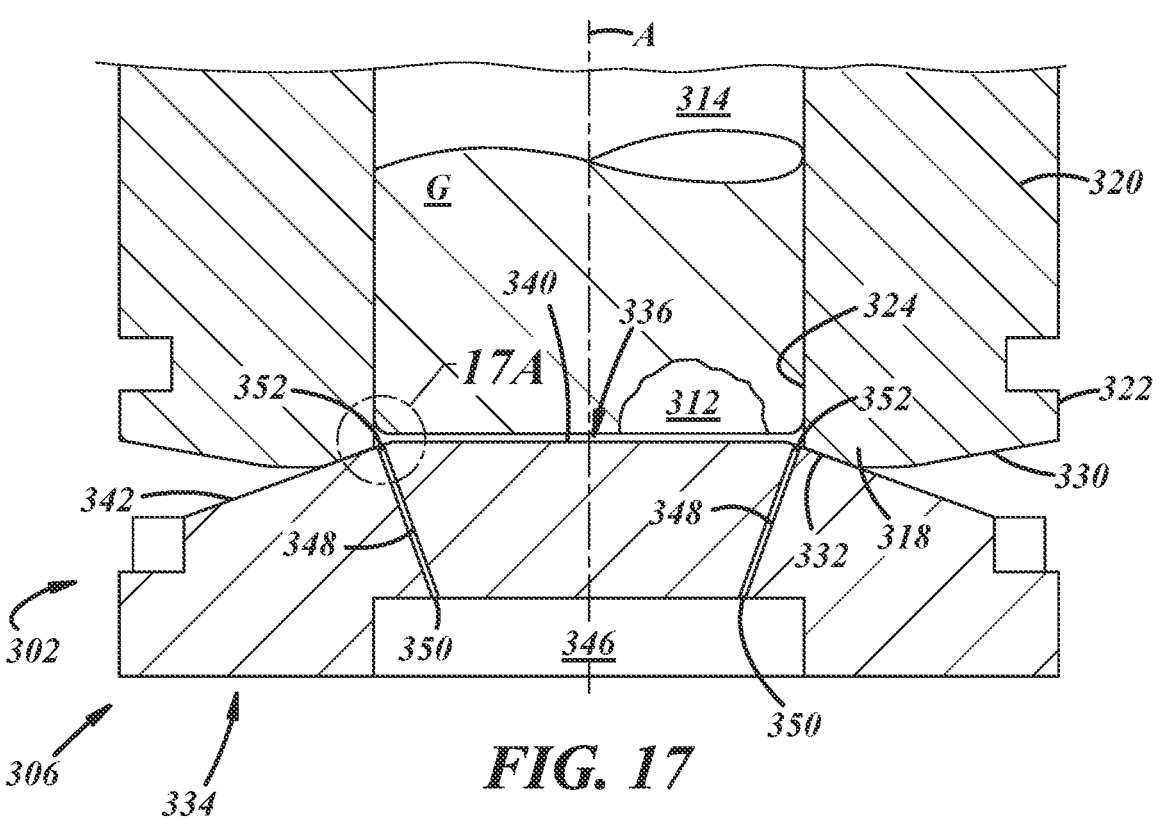
FIG. 17 is an enlarged, fragmentary, cross-sectional view taken from circle 17 of FIG. 15 around a lower portion of the transport cup of FIG. 15 and shown carrying a glass charge.

With reference to FIG. 17, the outlet end 318 of the conduit 304 may be tapered or beveled or, as shown, compound-tapered or compound-beveled to include an outer oblique surface 330 extending radially inwardly and axially downwardly from the outer surface 322 of the conduit sidewall 320 and an inner oblique surface 332 extending radially inwardly and axially upwardly from the outer oblique surface 330 to the inner surface 324 of the conduit sidewall 320. The outer and inner oblique surfaces 330, 332 may be straight surfaces, or rounded excurvate or incurvate surfaces. The transition between the outer and inner oblique surfaces 330, 332 may be sharp or may be rounded.

With reference to FIGS. 15 and 16, the endcap 306 includes a lower end 334, an upper end 336 that may be axially opposite the lower end 334, and a side periphery 338 that extends between the lower and upper ends 334, 336 and that may include mounting reliefs 339, e.g., mounting scallops. The upper end 336 includes an end surface 340 and may include an oblique surface 342 obliquely extending between the end surface 340 and the side periphery 338 and, as best shown in FIG. 15, the lower end 334 includes a base surface 344 that may be axially opposite the end surface 340 and may include a fluid pocket 346 (FIG. 15) in the base surface 344. The oblique surface 342 may be a straight bevel surface as shown, or may be a rounded incurvate or excurvate surface. The endcap 306 also includes one or more fluid supply passages 348 extending between the lower and upper ends 334, 336. When the endcap 306 is in an open or dispensing position with respect to the conduit 304, as best shown in FIGS. 11 and 13, the endcap 306 is spaced from and does not cover or block the conduit outlet 312 to allow a molten glass charge to exit the conduit 304 for delivery into a blank mold (not shown). When the endcap 306 is in a closed or transport position with respect to the conduit 304, as best shown in FIGS. 12 and 14, the endcap 306 may engage or be located closely adjacent to the conduit 304 and so that the endcap 306 covers or blocks the conduit outlet 312 sufficiently to retain the glass charge within the conduit 304.

With reference again to FIG. 17, the molten glass charge G is axially spaced apart from the end surface 340 of the endcap 306. Also, the one or more fluid supply passages 348 include one or more lower or cup exterior openings 350 open to the fluid pocket 346 of the lower end 334 of the endcap 306, and one or more upper or cup interior inlets 352 open to the oblique surface 342 of the upper end 336 of the endcap 306. The plurality of fluid supply passages 348 may extend through the endcap 306 at one or more oblique angles with respect to the conduit passage axis A. In this embodiment, the one or more oblique angles diverge from the conduit passage axis A in a direction from the lower end 334 toward the upper end 336 but, in other embodiments, the oblique angle(s) may converge toward the conduit passage axis A in a direction from the lower end 334 toward the upper end 336. In yet other embodiments, the fluid supply passages 348 may extend orthogonally, for example parallel to the axis A.

The size, quantity, orientation, and/or configuration of the fluid supply passages 348, in addition to the type, flow rate, pressure, and other characteristics of the fluid supplied through the fluid supply passages 348, may be chosen so as to ensure that the fluid supplied into the transport cup 302 between the molten glass charge G and the transport cup 302 is sufficient to displace desired portions of the molten glass charge G but not so large as to push the molten glass charge G out of contact with the endcap 306 or eject the molten glass charge G out of the transport cup 302. In a particular example, air may be supplied through the passages 348 at a relatively higher flow rate as the molten glass charge G is loaded into the transport cup 302 and, in contrast, the air may be supplied through the passages 348 at a relatively lower flow rate after the charge G is loaded and the cup 302 travels to the blank molds.

With reference again to FIG. 16, in this embodiment the plurality of fluid supply passages 348 includes a circular array of fluid supply passages 348 but, in other embodiments, the fluid supply passage(s) may include one or more ovular arrays, linear arrays, rectangular arrays, or any other arrangement of fluid supply passages 348 suitable to displace one or more portions of a molten glass charge while in the transport cup 302. Additionally in this embodiment, the plurality of fluid supply passages 348 extends through the oblique surface 342 but, in other embodiments, the fluid supply passage(s) 348 instead may extend through the end surface 340 and/or through an intersection 341 of the end and oblique surfaces 340, 342 or any combination thereof. The intersection 341 may be a sharp edge or may be a rounded surface.

With reference again to FIG. 17, in the closed position, the upper end 336 of the endcap 306 is located at the outlet end 318 of the conduit 304, and the molten glass charge G is retained in the conduit passage 314 by the endcap 306 at the outlet end 318 of the conduit 304 and closes the outlet 312. The upper end 336 of the endcap 306 and the outlet end 318 of the conduit 304 have cooperating mating surfaces. More particularly, in this illustrated embodiment, the oblique surface 342 of the upper end 336 of the endcap 306 may be located against the inner oblique surface 332 of the outlet end 318 of the conduit 304. The cooperating oblique surfaces 332, 342 facilitate good coaxial self-alignment of the endcap 306 relative to the conduit 304 and good sealing therebetween in the closed position of the endcap 306 to reduce or eliminate gaps therebetween. More specifically, here the end surface 340 has an outer diameter that is smaller than an inner diameter of the outlet 312 of the conduit 304, and the cup interior inlets 352 of the fluid supply passages 348 are radially outward of the end surface 340 yet radially inward of the inner diameter of the outlet 312. In the illustrated embodiment, the surfaces 332, 342 are in direct contact with one another such that there is no axial gap between the surfaces 332, 342. In other embodiments, as will be described below with respect to a subsequent embodiment, in a closed state of the transport cup 302 with the endcap 306 in a closed or transport position with respect to the conduit 304, the upper end 336 of the endcap 306 may be slightly axially spaced apart from the outlet end 318 of the conduit 304. In such embodiments, the axial gap may be 0.003" to 0.030" including all ranges, subranges, endpoints, and values of that range. In other embodiments, one or more exhaust reliefs (not shown) may be provided in one or the other or both of the surfaces 332, 342 to allow gas to escape therethrough to atmosphere or elsewhere. In the illustrated embodiment the endcap 306 axially overlaps the conduit 304 and a portion of the upper end 336 of the endcap 306 protrudes into a corresponding portion of the outlet end 318 of the conduit 304.

Figure 17A:
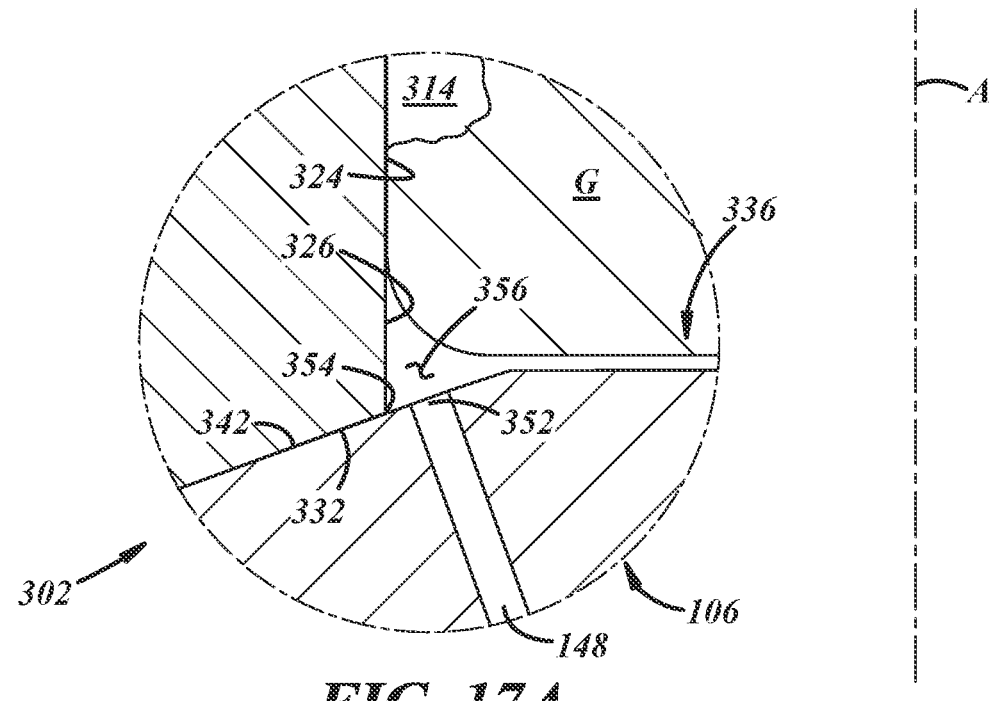
FIG. 17A is a further enlarged, fragmentary, cross-sectional view taken from circle 17A of FIG. 17 around a portion of the transport cup of FIG. 17, and illustrating a relationship between the conduit, the glass charge, the endcap, and a fluid supply passage of the endcap.

With reference now to FIG. 17A, an interior junction 354 of the transport cup 302 is established at an intersection 306 and the conduit 304, for example, at an intersection of the oblique surface 342 of the upper end 336 of the endcap 306 and the inner surface 324 of the conduit 304. Fluid is supplied through the fluid supply passage(s) 348, and the fluid may include pressurized gas, for example, air, cooled air, heated air, humidified air, dehumidified air, oxygen, nitrogen, or any other gas suitable for contact with molten glass. Although not illustrated, those of ordinary skill in the art would recognize that the pressurized gas may be provided from a vessel pressurized with the gas, a gas line pressurized by a pump, or any other suitable source of pressurized gas. Without fluid supplied through the fluid supply passage(s) 348 of the endcap 306, the molten glass charge would engage the junction 354 which would form a parting line in the molten glass charge G. In at least some implementations, when the endcap 306 covers the conduit 304 such that the fluid supply passages 348 are in communication with the transport cup 302, fluid is conveyed into the transport cup 302 to displace at least a portion of the molten glass charge G away from the junction 354 of the mating surfaces of the conduit 304 and the endcap 306.

In this illustrated embodiment, fluid is supplied through the endcap 306 into the transport cup 302 in a location proximate to and radially inward of the junction 354. As used herein, the term "proximate" means, in illustrative relative terms, closer to than further away from, such that, for example, one or more of the fluid supply passages 348 is more than halfway from the conduit passage axis A to the inner diameter of the inner surface 324 of the passage 314 at the outlet end 318 of the conduit 304. More specifically, one or more of the cup interior inlets 352 of the fluid supply passages 348 is located within 80 to 100 percent of the inner diameter of the passage 314 including all ranges, subranges, endpoints, and values of that range. The cup interior inlets 352 may have diameters of, for example, 0.5 to 2 mm, including all ranges, subranges, endpoints, and values of that range. Those of ordinary skill in the art would understand from the disclosure and teachings herein that the individual and collective surface areas of the inlets 352, and of any exhaust outlet gaps or reliefs (not shown), may be selected so as to achieve a desired total air mass flow into, through, and out of the transport cup 302 that results in a desired amount of displacement of the molten glass charge G. The fluid supply passages 348 may be perimetrically arranged in a circular array that is proximate to, including immediately adjacent or even overlapping, the interior junction 354 and coaxial with the circular interior junction 354.

Also, the fluid is supplied between the transport cup 302 and the molten glass charge G to maintain the molten glass charge G separate from the junction 354 and create a gap 356 between the transport cup 302 and a lower end of the molten glass charge G and, more particularly, between the junction 354 of the transport cup 302 and the lower end of the molten glass charge G. Therefore, the molten glass charge G does not contact the junction 354 and, thus, formation of the parting line is avoided. The fluid supply passages 348, therefore, facilitate avoidance or reduction of parting lines formed in the molten glass charge G and, thus, facilitate avoidance or reduction of carry-through of the parting lines to a finished glass container formed from the molten glass charge G.

With reference again to the embodiment illustrated in FIGS. 11 and 12, the transporter 300 also may include a conduit carrier 358 in which the conduit 304 is carried, and a conduit carrier mount 360 that is configured to mount the transporter 300 to a transporter mover (not shown). Additionally, the transporter 300 may include an endcap carrier 362 on which the endcap 306 is carried, and an endcap actuator 364 coupled to the endcap carrier 362 and activatable to move the endcap 306 to uncover and to cover the outlet 312 of the conduit 304.

The conduit carrier 358 may include a vertically extending sleeve 366 that may be radially spaced from the conduit 304, and may be supplied with gas via a gas inlet 368 and a gas supply S (FIG. 12) in fluid communication with the inlet 368. The conduit carrier 358 also may include upper and lower mounting rings 370, 372 that are coupled to the conduit carrier 358 and engaged to corresponding portions of the conduit 304 as will be described in greater detail below. The sleeve 366 may include a tubular body 374 and upper and lower caps 376, 378 that may be fastened, welded, threaded, or otherwise coupled to corresponding ends of the tubular body 374 to establish a gas volume between the sleeve 366 and the conduit 304.

With reference to FIGS. 13 and 14, the lower mounting ring 372 may be fastened, welded, threaded, or otherwise coupled to the lower cap 378 of the sleeve 366 and may have one or more radially inwardly extending tongues 380 that fit into one or more corresponding grooves 382 in the conduit 304. The lower mounting ring 372 may be split, and constituted from semi-circumferential halves to facilitate assembly of the tongue-and-groove connection. The upper mounting ring 370 (FIGS. 11 and 12) and mounting arrangement to the conduit 304 may be similar to that of the lower mounting ring 372. The conduit carrier 358 also may include a perforated baffle 384 located radially between the sleeve 366 and the conduit 304 to distribute gas supplied through the conduit carrier 358 to the conduit 304. Portions of the baffle 384 may be fastened, welded, threaded, interference fit, or otherwise coupled to corresponding portions of the sleeve 366.

With reference again to FIGS. 11 and 12, the conduit carrier mount 360 may include a mounting plate 386 coupled to the conduit carrier 358, a coupling flange 388 for coupling to a transporter mover (not shown), and a gusseted tubular connector 390 between the mounting plate 386 and the coupling flange 388. The mounting plate 386 may be fastened, welded, threaded, or otherwise coupled in any suitable manner to a corresponding portion of the sleeve 366 of the conduit carrier 358 and such a mounting arrangement will be described in further detail below with respect to a subsequent embodiment. The coupling flange 388 may be fastened to, for example, the end of a robot arm (not shown), such that the transporter 300 may be a robot end-effector.

With reference again to FIG. 14, the endcap carrier 362 may include a movable holder 392, which, in this embodiment, takes the form of a cantilevered arm that is rotatable about an actuator axis C offset from the conduit passage axis A so as to be laterally translatable with respect to the conduit carrier 358 and conduit 304, and also may be axially translatable with respect to the conduit carrier 358 and conduit 304. The endcap carrier 362 also includes an endcap mounting block 394 coupled to the holder 392 to facilitate precision location of the endcap 306 with respect to the conduit 304. The mounting block 394 may be fastened to the holder 392 by fasteners 396 having heads 396a and washers 396b engaging the mounting reliefs 339 in the endcap 306, and having shanks 396c extending through corresponding fastener passages of the mounting block 394, and having threaded ends threaded into corresponding threaded portions of the holder 392 to retain the endcap 306 to the holder 392.

With reference again to FIGS. 11 and 12, the endcap actuator 364 may be or may include a rotary actuator or a combined rotary and linear actuator. The illustrated actuator 364 includes a shaft support 400, a motor 402 axially aligned with the shaft support 400, and an actuator shaft 404 carried through the shaft support 400 at an upper end of the shaft 404 and coupled to the arm 392 at a lower end of the shaft 404. The motor 402 may be an electric, hydraulic, or pneumatic motor that can rotate the shaft 404 and that, in this embodiment, may be configured to also axially displace the shaft 404 such that the motor 402 and shaft 404 can move the endcap carrier 362 and the endcap 306. In this illustrated embodiment, the actuator 364 can both rotate and linearly translate the endcap carrier 362 and the endcap 306, such that the actuator 364 can articulate the endcap carrier 362 and the endcap 306. The actuator 364 may be coupled to the conduit carrier 358 via a mounting plate 406 that may be fastened to a corresponding portion of the sleeve 366, and one or more adapter brackets 408 that may be fastened to corresponding portions of the mounting plate 406 and to corresponding portions of the actuator 364, such as upper and lower portions of the motor 402. With additional reference to FIG. 14, the actuator 364 may be activated to linearly (e.g., axially) displace the endcap 306 downward away from the outlet end 318 of the conduit 304 and to rotate the endcap 306 laterally so that the endcap 306 is not axially aligned with, and is further out of the way of, the outlet 312 of the conduit 304. Of course, the actuator 364 may be activated in reverse, to rotate the endcap 306 laterally back toward and directly under the conduit outlet 312, and to displace the endcap 306 linearly back toward and engaged with the outlet end 318 of the conduit 304.

FIGS. 18-24 show another illustrative embodiment of a molten glass transporter 300. This embodiment is similar in many respects to the embodiments of FIGS. 1-17 and like numerals among the embodiments generally designate like or corresponding elements throughout the several views of the drawing figures. Accordingly, the descriptions of the embodiments are incorporated into one another, and description of subject matter common to the embodiments generally may not be repeated here.

Figures 18, 19:
FIG. 18 is a perspective view of a molten glass transporter in accordance with another illustrative embodiment of the present disclosure, illustrating a transport cup including a conduit and a split endcap, and also illustrating a conduit carrier carrying the conduit and a split endcap carrier carrying the split endcap and in an open position with respect to the conduit carrier.
FIG. 19 is a perspective view of the molten glass transporter of FIG. 8, illustrating the split endcap and endcap carrier moved to a closed position with respect to the conduit carrier.
Figures 20, 21:
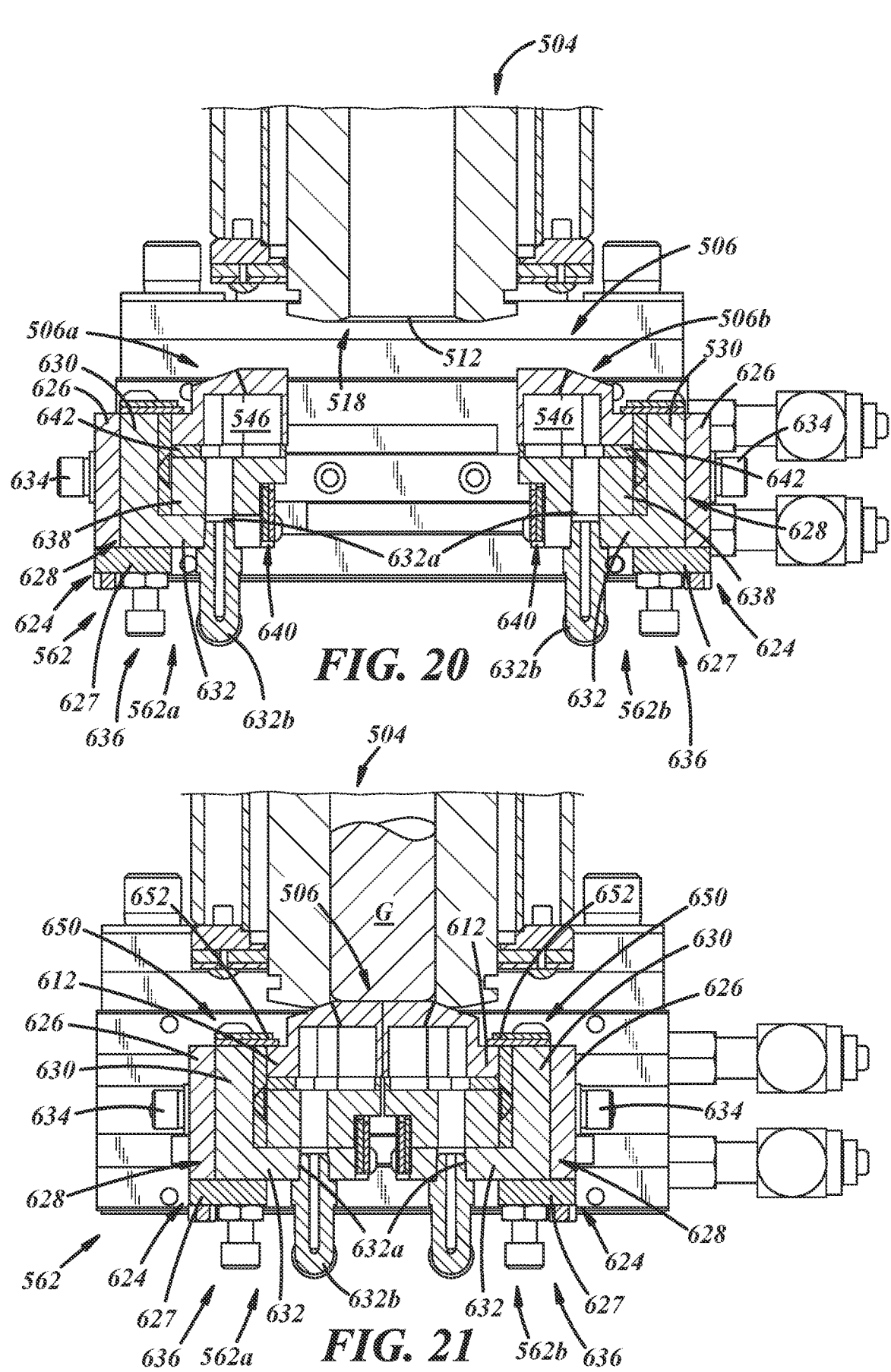
FIG. 20 is an enlarged, fragmentary, cross-sectional view of a lower portion of the molten glass transporter of FIG. 18.
FIG. 21 is an enlarged, fragmentary, cross-sectional view of the lower portion of the molten glass transporter of FIG. 19.

With reference to FIGS. 18 and 19, the transporter 500 includes a transport cup 502 having a conduit 504, and an endcap 506 for the conduit 504. In contrast to the previous embodiment, here the endcap 506 is a split endcap including endcap portions or halves 506a,b. In this embodiment, to open the transport cup 502, the endcap 506 is movable axially away from the conduit 504 and the endcap halves 506a,b are movable away from one another along an open/close axis B of the endcap halves 506a,b. Conversely, to close the transport cup 502, the endcap halves 506a,b are movable toward one another along the open/close axis B of the split endcap halves 506a,b and the endcap 506 is movable axially toward the conduit 504. In at least some implementations, the endcap open/close axis B is perpendicular to the conduit passage axis A but other orientations may be used as desired. In an open or dispensing position with respect to the conduit 504, as best shown in FIGS. 18 and 20, the endcap halves 506a,b are moved away from one another to allow a molten glass charge (not shown) to exit the conduit 504 for delivery into a blank mold (not shown) below. In a closed or transport position with respect to the conduit 504, as best shown in FIGS. 19 and 21, the endcap halves 506a,b are moved together so that the endcap 506 covers the conduit 504 from underneath the conduit 504 to retain a molten glass charge G (FIG. 21) within the transport cup 502.

Figures 22, 23, 24:
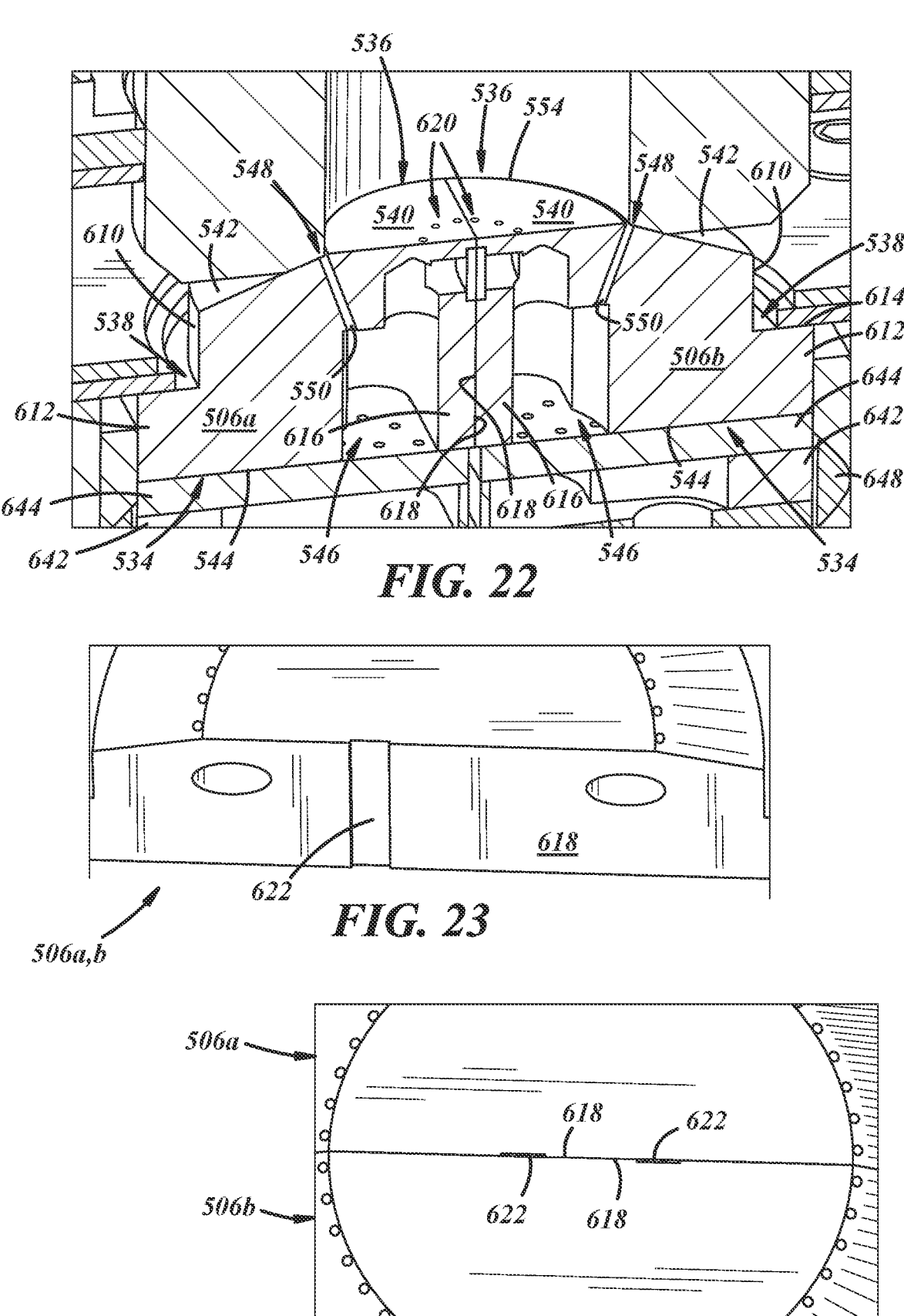
FIG. 22 is an enlarged, fragmentary, perspective, cross-sectional view of the lower portion of the molten glass transporter shown in FIG. 19, and illustrating a lower portion of the transport cup including a lower portion of the conduit and the split endcap.
FIG. 23 is an enlarged, fragmentary, perspective, cross-sectional view of one half of the split endcap of FIG. 22, illustrating an exhaust vent channel therein.
FIG. 24 is an enlarged, fragmentary, upper perspective view of the split endcap of FIG. 22, illustrating exhaust vent channels therein.

With reference now to FIG. 22, the endcap halves 506a,b include lower ends 534, upper ends 536 axially opposite the lower ends 534, and side peripheries 538 that extend between the lower and upper ends 534, 536 and that may include shoulders 610 that may face radially outwardly and extend axially and circumferentially, mounting flanges 612 that may face axially and extend radially outwardly and circumferentially with upper mounting surfaces 614. The upper ends 536 include end surfaces 540 and also may include oblique surfaces 542 obliquely extending between the end surfaces 540 and the side peripheries 538. The lower ends 534 include base surfaces 544 and also may include fluid pockets 546 in the base surfaces 544. The endcap halves 506a,b include facing walls 616 having axially and diametrically extending mating surfaces 618 that may contact one another when the endcap 506 is in the closed or transport position. The mating surfaces 618 may extend at an angle other than parallel to the axis of the conduit passage.

With continued reference to FIG. 22, the endcap halves 506a,b also include a first plurality of fluid supply passages 548 extending between the lower and upper ends 534, 536, and may have lower openings 550 in fluid communication with the base surfaces 544 and/or fluid pockets 546 in the base surfaces 544. More specifically, in this implementation, the endcap halves 506a,b also may include a second plurality of fluid supply passages 620 disposed radially inward with respect to the first plurality of fluid supply passages 548 and in fluid communication with or open to the end surfaces 540 and in fluid communication with the pockets 546. More specifically, the second plurality of fluid supply passages 620 may be located through a central portion of the endcap 506 to displace at least a portion of the molten glass charge G away from the central portion. The second plurality of fluid supply passage 620 may be used to provide additional force that may be used to hold the molten glass charge G (FIG. 21) more completely off of the endcap 506, if desired. The fluid supply passages 548, 620 may be in the form of circular arrays, which may be circumferentially interdigitated, staggered, or offset with respect one another. In the closed position, when the endcap 506 covers the conduit 504, the fluid supply passages 548 are in communication with the transport cup 502 to convey fluid thereto to displace at least a portion of a molten glass charge away from an interior junction 554 of corresponding surfaces of the conduit 504 and the endcap 506. More specifically, fluid is supplied through the first plurality of fluid supply passages 548 into the transport cup 502 in a location adjacent to and/or radially overlapping the junction 554 and between the transport cup 502 and the molten glass charge to create a gap (not shown) around at least part of the glass charge and between at least part of the glass charge and the junction 554.

With reference now to FIGS. 23 and 24, one or both of the endcap halves 506a,b also includes a vertically extending channel 622 in one or both mating surfaces 618 thereof to provide one or more fluid exhaust outlets in fluid communication with the interior of the transport cup 502 and the atmosphere. As shown in FIG. 24, both of the endcap halves 506*a,b* may include the channels 622, radially offset from one another. In other embodiments, a fluid exhaust outlet may be established via a gap (not shown) between the mating surfaces 618. The transverse cross-sectional size of the exhaust channels 622, and/or the gap between the mating surfaces 618, may be chosen so as to ensure that the fluid supplied into the transport cup 502 is sufficient to displace desired portions of a molten glass charge but not so large as to push the molten glass charge out of contact with the endcap 506 or eject the molten glass charge out of the transport cup 502.

With reference again to FIGS. 18 and 19, the illustrated transporter 500 also includes a conduit carrier 558 in which the conduit 504 is carried and which may be configured to be coupled to a conduit carrier mount (not shown) and a transporter mover (not shown). The transporter 500 also includes a split endcap carrier 562 on which the split endcap 506 is carried, and an endcap actuator 564 coupled to the split endcap carrier 562 and activatable to move the split endcap 506 to uncover and cover an outlet 512 (FIG. 20) of the conduit 504.

The conduit carrier 558 may include a sleeve 566 that may be cylindrical and may be oblong and coaxial with and radially spaced from the conduit 504, and may be supplied with gas via a gas inlet 568, a plurality of gas outlets 569, and a gas path (not shown) therebetween. The conduit carrier 558 also may include upper and lower mounting rings 570, 572 that are coupled to the conduit carrier 558 and engaged to upper and lower portions of the conduit 504. The sleeve 566 may include a tubular body 574, upper and lower caps 576, 578 that may be welded, fastened, interference fit, or otherwise coupled to corresponding ends of the tubular body 574 to establish a gas volume between the sleeve 566 and the conduit 504. The conduit carrier 558 also may include oblong mounting bosses 579 carried by the tubular body 574 of the sleeve 566 and that may be configured to be coupled to any suitable conduit carrier mount (not shown) for coupling to any suitable transporter mover (not shown).

With reference to FIGS. 20 and 21, the split endcap carrier 562 may include translatable portions or halves 562*a,b* each carrying a respective portion or half 506*a,b* of the split endcap 506. The halves 562*a,b* of the split endcap carrier 562 may include outer holders 624 having sidewalls 626 and lower walls 627 coupled to the sidewalls 626, and inner mounting blocks 628 carried by the outer holders 624 and having inner sidewalls 630 coupled to the sidewalls 626 of the outer holders 624 and also having lower walls 632 carried on the lower walls 627 of the outer holders 624. The inner mounting blocks 628 may be movably fastened to the sidewalls 626 of the outer holders 624 by fasteners 634 having threaded ends (not shown) threaded into corresponding threaded holes (not shown) in the inner mounting blocks 628, shanks (not shown) extending through enlarged holes (not shown) in the sidewalls 626 of the outer holders 624, and heads trapping washers to the sidewalls 626 of the outer holders 624. Also, positions of the inner mounting blocks 628 may be finely adjusted by set screws 636 extending through the lower walls 627 of the outer holders 624 and engaged to the lower walls 632 of the inner mounting blocks 628. Those of ordinary skill in the art would recognize that the fasteners 634 can be loosened, the set screws 636 turned, the inner mounting blocks 628 moved to desired positions, and the fasteners 634 tightened to lock the inner mounting blocks 628 in their desired positions to ensure a desired location of the endcap halves 506*a,b* relative to one another and/or the conduit 504. The lower walls 632 of the inner mounting blocks 628 have fluid ports 632*a* therein that are coupled to fluid fittings 632*b*, for example, via threaded connections.

With continued reference to FIGS. 20 and 21, the endcap carrier halves 562*a,b* further may include pedestals 638 between the inner mounts and the endcap halves 506*a,b* that may be provided to serve as spacer blocks or insulators, and retainer plates 640 fastened to the lower walls 632 of the inner mounting blocks 628 to retain the pedestals 638 to the inner mounting blocks 628. The carrier halves 562*a,b* additionally may include flow redirector plates 642 between the pedestals 638 and the endcap halves 506*a,b* to redirect flow from the relatively radially outboard fluid supply passages of the outer holders 624 and the mounting blocks 628 to the relatively radially inward fluid pockets 546 of the endcap halves 506*a,b*. The carrier halves 562*a,b* further may include apertured gaskets 644 (FIG. 22) between the flow redirector plates 642 and the endcap halves 506*a,b*. The endcap halves 506*a,b* may be coupled to the inner mounting blocks 628, for example, via fasteners 650 and one or more mounting rings 652 between heads of the fasteners 650 and the mounting flanges 612 of the endcap halves 506*a,b*.

With reference to FIGS. 18 and 19, the split endcap carrier 562 is linearly translatable away from the conduit carrier 558 and the conduit 504, and the halves 506*a,b* thereof are linearly translatable away from and toward one another via the endcap actuator 564 along an open/close axis B. The endcap actuator 564 may include a first actuator 564*a* to move the split endcap carrier 562 vertically up and down, and a second actuator 564*b* to move the halves 506*a,b* laterally back and forth. The first actuator 564*a* may include a movable portion 654 that is fixed to an actuator arm 656 that carries the second actuator 564*b* and the split endcap carrier 562, which is coupled to the second actuator 564*b*, and may have one or more fixed portions 658 coupled to corresponding portions of an actuator mount 660 that may be coupled to the conduit carrier 558 in any suitable manner. The first actuator 564*a* may be or may include a linear cylinder and may be pneumatic or hydraulic, or may include an electric device such as a linear motor, a rotary motor with a ball screw, a solenoid, or any other arrangement suitable to cause linear movement. The second actuator 564*b* may be fixed to a mounting adapter 662 that is coupled to a lower end of the actuator arm 656, and may be movably coupled to the halves 506*a,b* of the split endcap carrier 562. The second actuator 564*b* may be or may include a self-centering rodless cylinder, gear rack device, or the like, and may be pneumatically, hydraulically, or electrically powered.

With additional reference to FIGS. 20 and 21, the actuators 564*a,b* (FIGS. 18 and 19) may be activated to linearly displace the endcap 506 downward away from the outlet end 518 (FIG. 20) of the conduit 504 and to linearly displace the halves 506*a,b* of the split endcap 506 laterally and further out of the way of the outlet end 518 (FIG. 20) of the conduit 504. Of course, the actuators 564*a,b* (FIGS. 18 and 19) may be activated in reverse, to linearly displace the halves 506*a,b* of the endcap 506 laterally back toward and directly under the conduit 504, and to displace the endcap 506 linearly back to the outlet end 518 (FIG. 20) of the conduit 504.

FIGS. 25-33 show another illustrative embodiment of a molten glass transporter 700. This embodiment is similar in many respects to the embodiments of FIGS. 1-24 and like numerals among the embodiments generally designate like or corresponding elements throughout the several views of the drawing figures. Accordingly, the descriptions of the embodiments are incorporated into one another, and description of subject matter common to the embodiments generally may not be repeated here.

Figure 27:
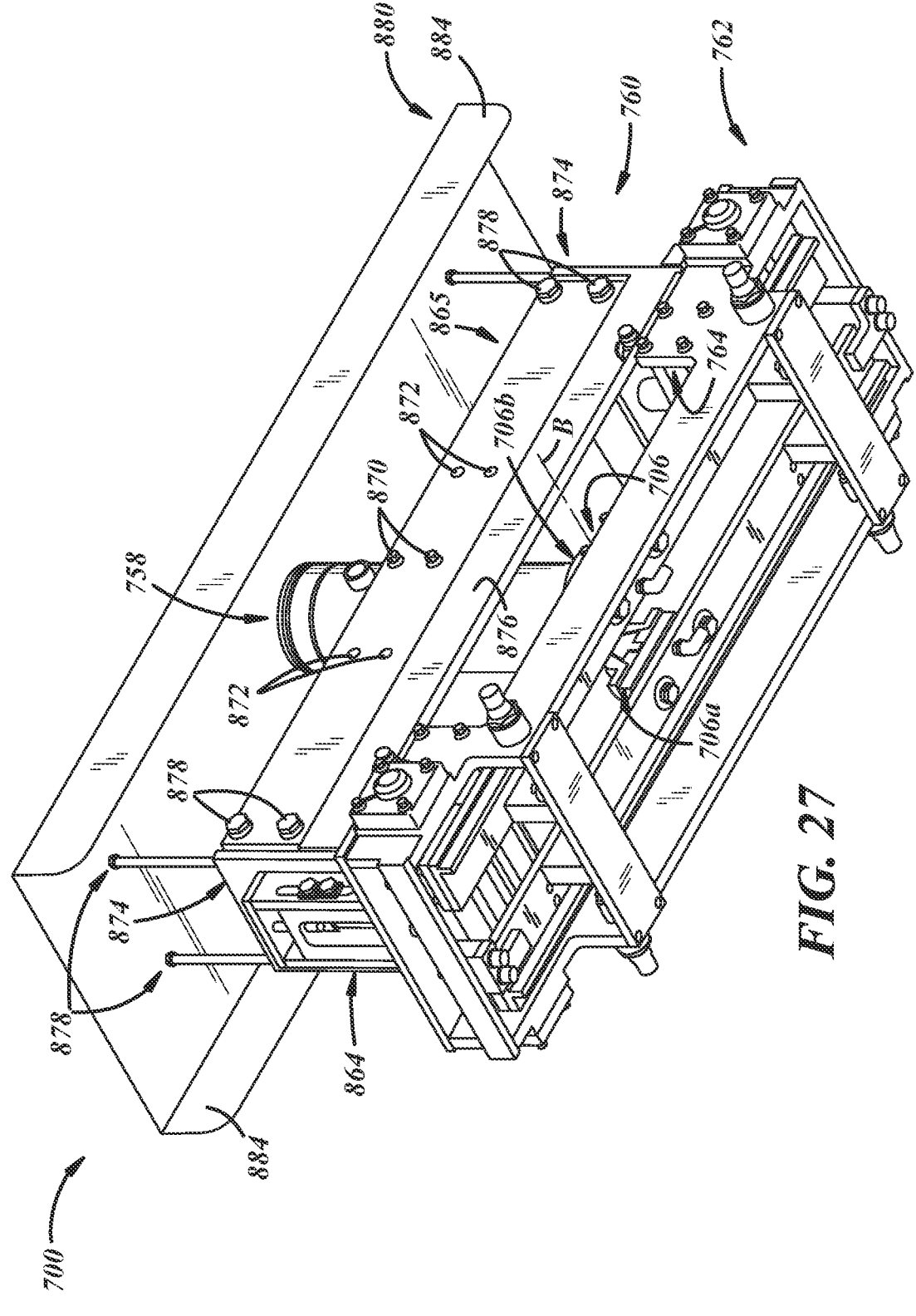
FIG. 27 is a lower perspective view of the molten glass transporter of FIG. 25.
Figure 28:
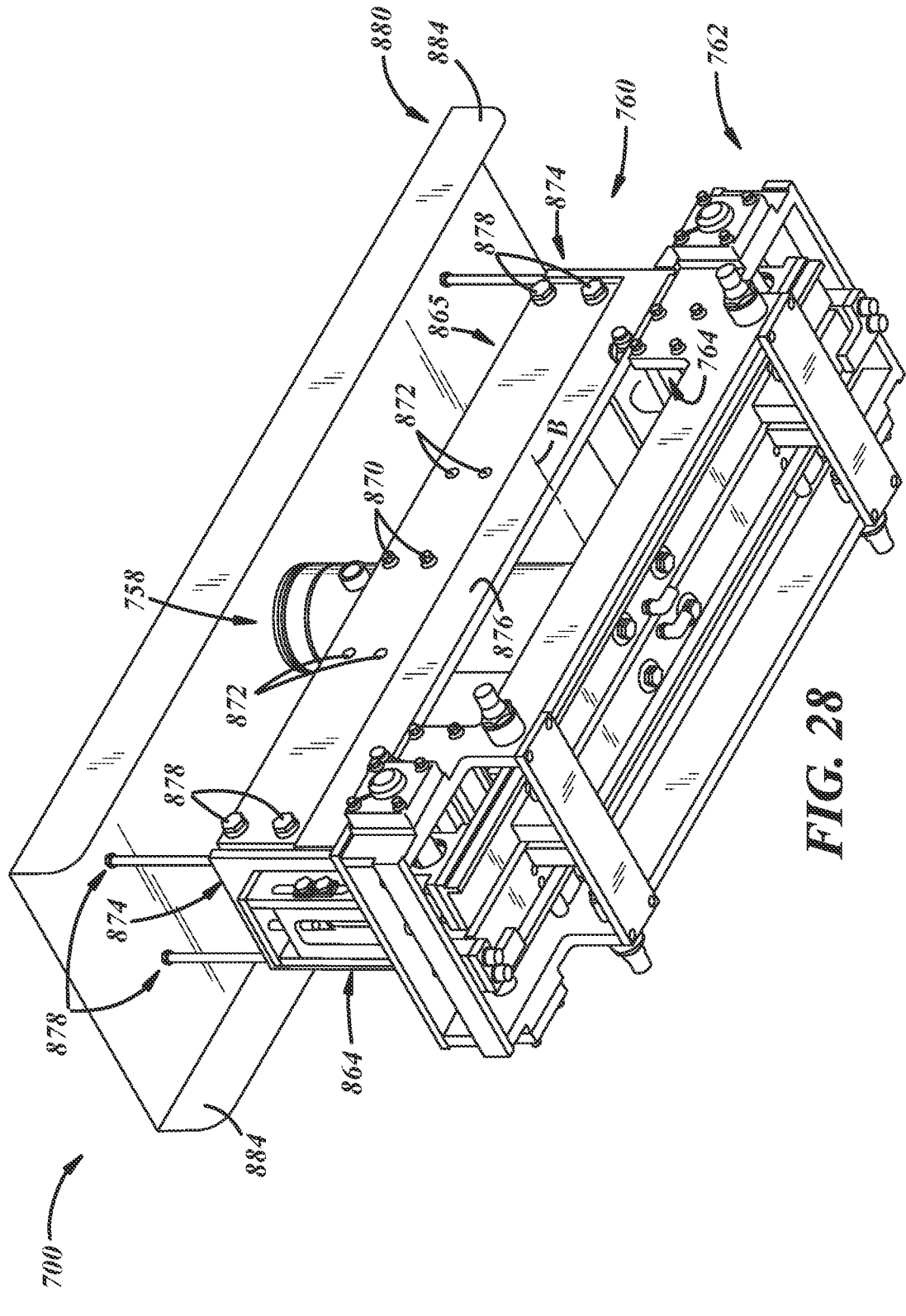
FIG. 28 is a lower perspective view of the molten glass transporter shown in FIG. 26.
Figure 29:
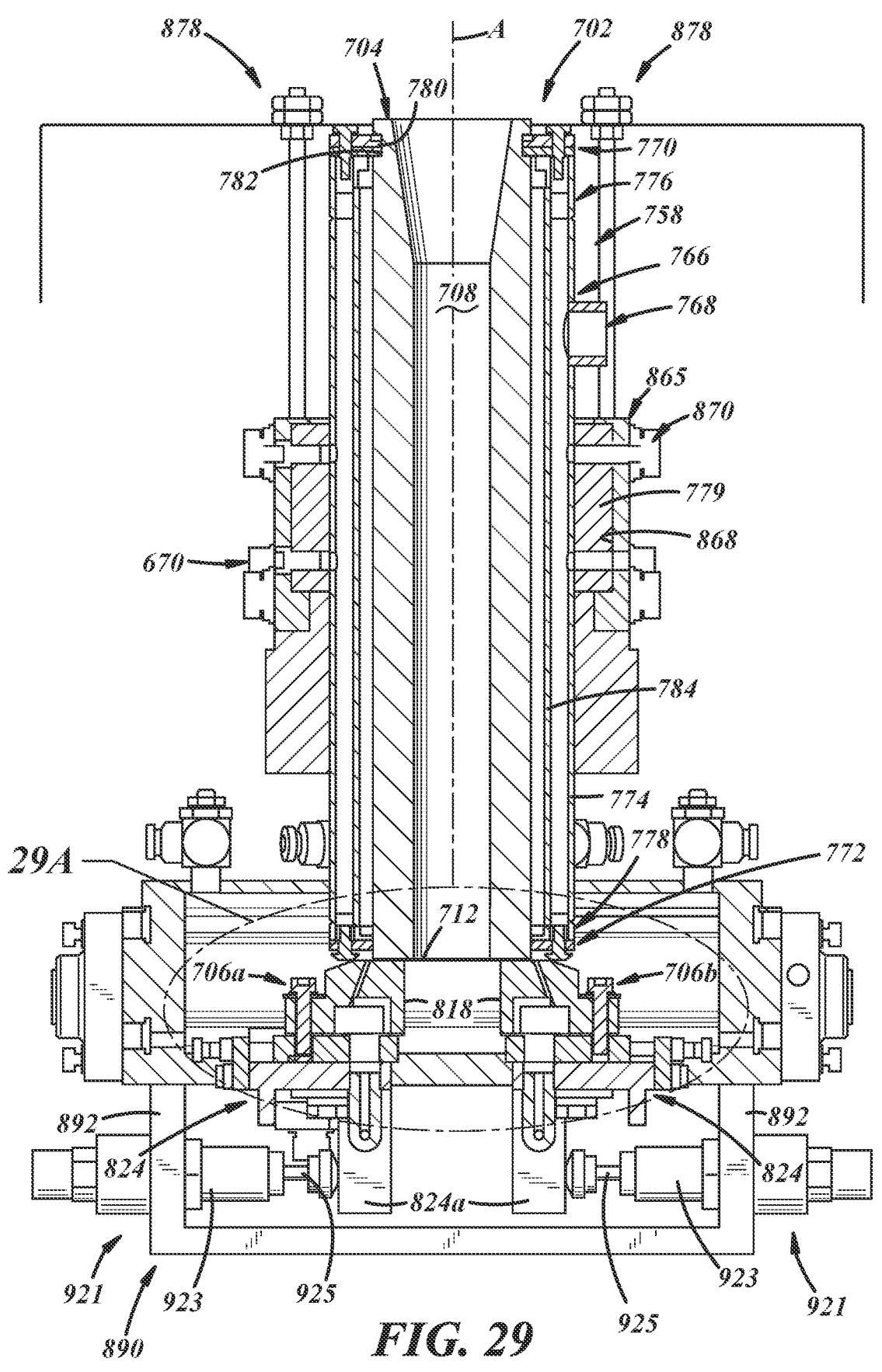
FIG. 29 is an enlarged cross-sectional view of a transport cup of the molten glass transporter taken along the line 29-29 in FIG. 25, showing a conduit, the conduit carrier, a split endcap, and the split endcap carrier.
Figure 30:
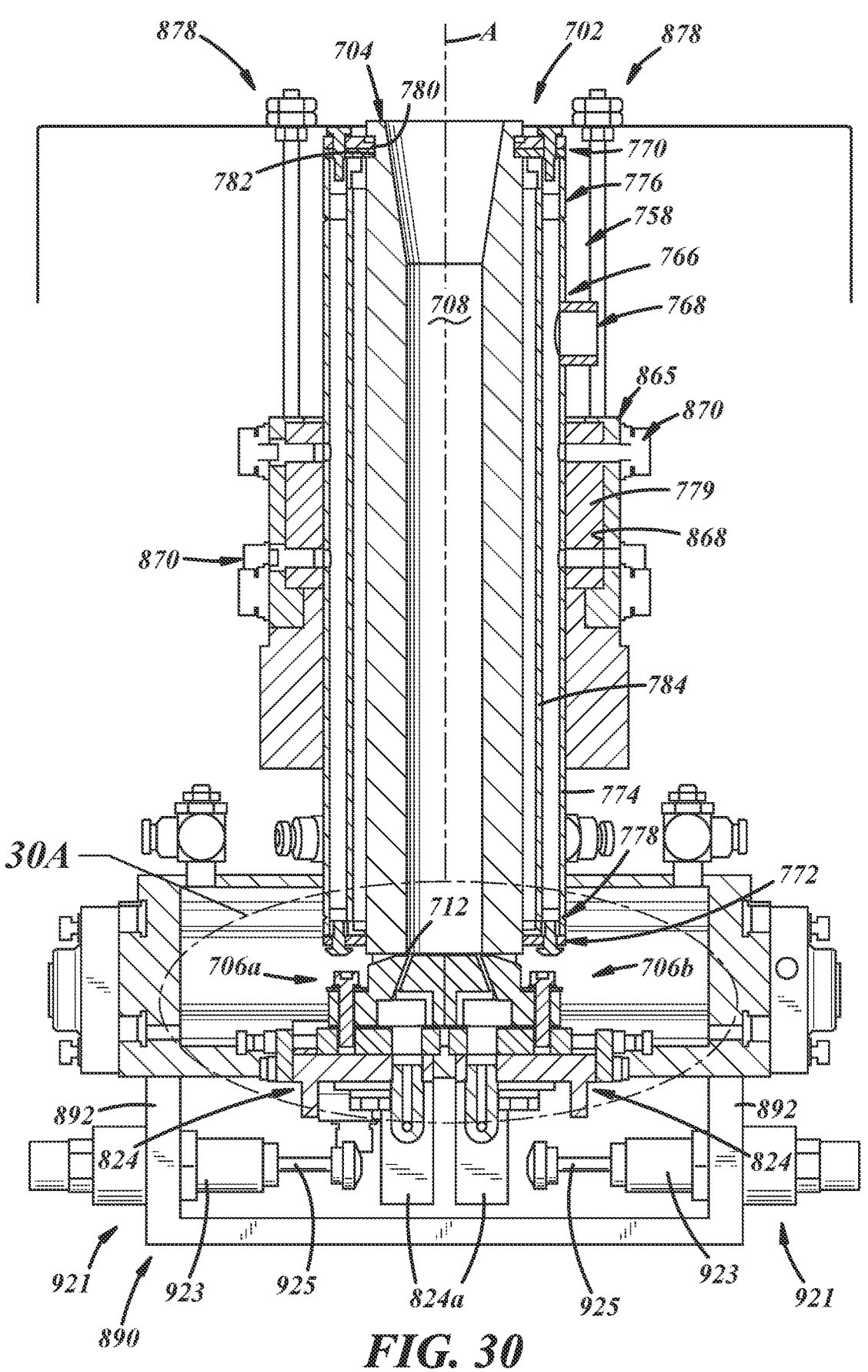
FIG. 30 is an enlarged cross-sectional view of a portion of the transport cup taken along line 30-30 in FIG. 26, shown in a closed position.

With reference to FIGS. 25-33 generally, the transporter 700 includes a transport cup 702 including a conduit 704, and a split endcap 706 underneath the conduit 704 and movable vertically away from and toward the conduit 704 and including endcap portions or halves 706a,b that are movable away from one another along an open/close axis B of the split endcap 706 to open the transport cup 702 and movable toward one another along the open/close axis B to close the transport cup 702 to establish a transport cup interior or cavity 708 (FIG. 30). In an open or dispensing position with respect to the conduit 704, as best shown in FIG. 29, the endcap halves 706a,b are moved away from one another to uncover or expose an outlet 712 of the conduit 704 to permit a molten glass charge to exit the transport cup 702 into a blank mold (not shown) positioned below the transport cup 702. In a closed or transport position with respect to the conduit 704, as best shown in FIG. 30, the endcap halves 706a,b are moved toward one another underneath the conduit 704 to cover the outlet 712 of the conduit 704 to retain a molten glass charge (not shown) in the transport cup 702. In contrast to the previously disclosed embodiments of FIGS. 11-24, here, the endcap 706 is opened and closed along a single axis: the lateral open/close axis B of the endcap halves 706a,b, such that the endcap 706 need not be opened and closed along the conduit passage axis A. Accordingly, the transporter 700 has reduced design complexity, improved ease of manufacture, fewer moving parts leading to a reduction in weight and increase in reliability, while improving the ability to control a molten glass charge during transport.

Figure 29A:
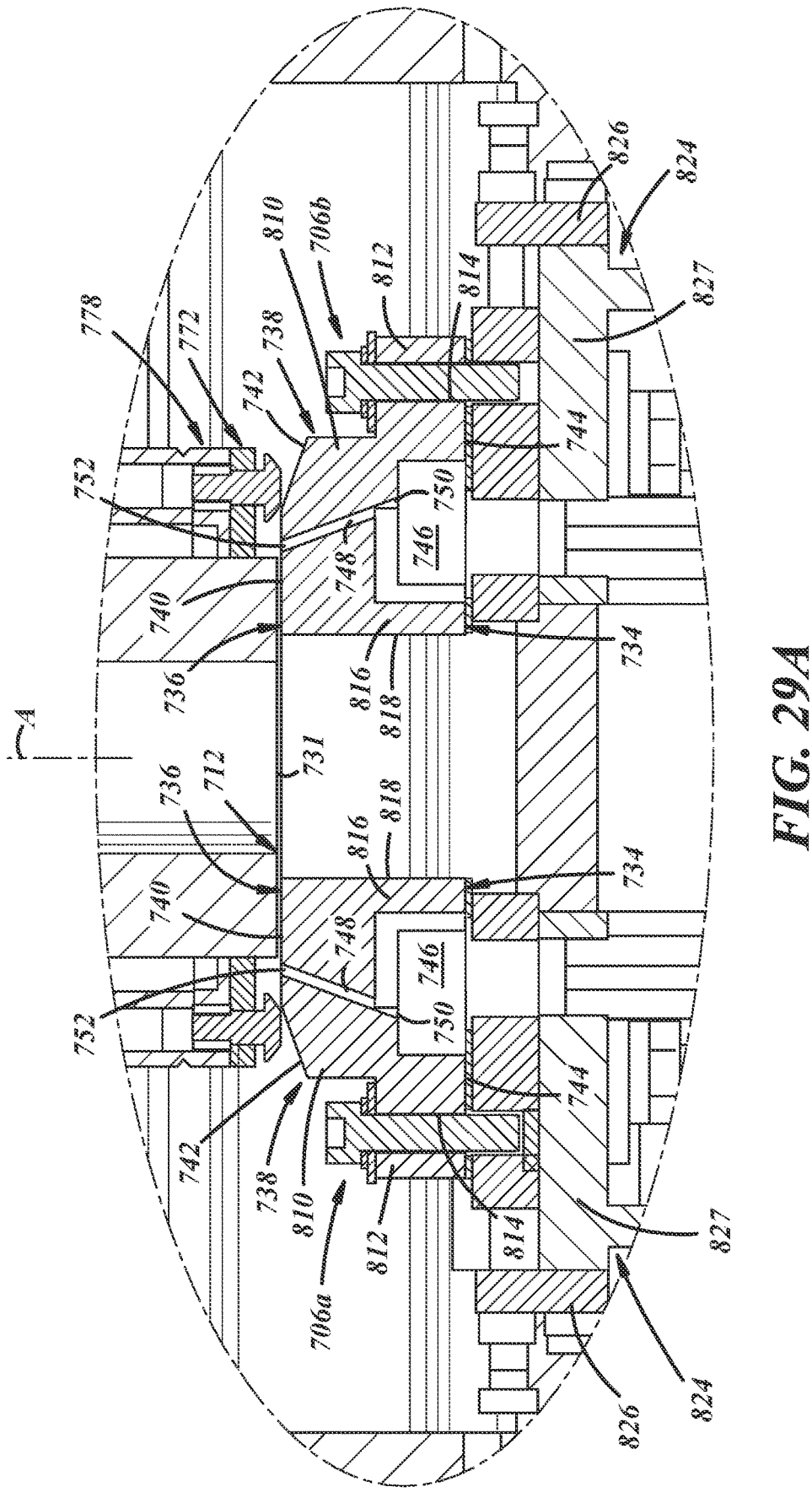
FIG. 29A is a further enlarged cross-sectional view of a portion of the transport cup of FIG. 29, taken from oval 29A.

With reference now to FIG. 29A, the endcap halves 706a,b include lower ends 734, upper ends 736 axially opposite the lower ends 734, and side peripheries 738 that extend between the lower and upper ends 736 and may include radially outwardly facing shoulders 810, mounting flanges 812, and fastener passages 814 extending through the mounting flanges 812. The upper ends 736 include end surfaces 740 and oblique surfaces 742 obliquely extending between the end surfaces 740 and the side peripheries 738. In other embodiments, the upper ends 736 need not include the oblique surfaces 742, wherein the end surfaces 740 could extend to the side peripheries 738 of the endcap 706. The lower ends 734 include base surfaces 744 and fluid pockets 746 in the base surfaces 744. The endcap halves 706a,b may include facing walls 816 having diametric mating surfaces 818 that may contact one another when the endcap 706 is in the closed or transport position.

The endcap halves 706a,b also include one or more fluid supply passages 748 extending between the lower and upper ends 736 and having lower openings 750 that may be in fluid communication with the fluid pockets 746. The fluid supply passages 748 may be in the form of circular arrays. When the endcap 706 covers the conduit 704, the fluid supply passages 748 are in communication with the transport cup 702 to convey fluid thereto to displace at least a portion of a molten glass charge away from an interior junction 754 (FIG. 30) of the mating surfaces of the conduit 704 and the endcap 706. More specifically, fluid is supplied through the endcap 706 into the transport cup 702 in a location at least partially radially inward with respect to the junction 754 and between the transport cup 702 and the molten glass charge.

Here, in contrast to the embodiment illustrated in FIGS. 18-24, the fluid supply passages 748 extend at one or more oblique angles that converge toward the conduit passage axis A in a direction from the lower ends 734 toward the upper ends 736, and the upper ends 736 of the endcap halves 706a,b are axially spaced away from the outlet end 718 of the conduit 704 such that gaps are established between the conduit 704 and the endcap halves 706a,b to establish transverse fluid exhaust outlets through which excess fluid from the transport cup 702 can escape to atmosphere. The heights of the gaps may be chosen so as to ensure that the fluid supplied into the transport cup 702 is sufficient to displace desired portions of the molten glass charge but not so large as to push the molten glass charge out of contact with the endcap 706 or eject the molten glass charge out of the transport cup 702.

With reference again to FIGS. 25-28, the transporter 700 also may include a conduit carrier 758 in which the conduit 704 is carried, and a conduit carrier mount 760 that is configured to mount the transporter 700 to a transporter mover (not shown). Additionally, the transporter 700 may include endcap carriers 762 on which the endcaps halves 706a,b are carried, and endcap actuators 764 coupled to the endcap carriers 762 and activatable to move the endcap halves 706a,b to uncover and to cover the outlet 712 of the conduit 704.

With reference to FIG. 29, the conduit carrier 758 may include an axially extending sleeve 766 that may be radially spaced from the conduit 704, and may be supplied with fluid via at least one fluid inlet 768. Also, the conduit carrier 758 also may include upper and lower mounting rings 770, 772 that are coupled to the conduit carrier 758 and engaged to upper and lower portions of the conduit 704. The sleeve 766 may include a tubular body 774 and upper and lower caps 776, 778 that may be welded, fastened, interference fit, or otherwise coupled to corresponding ends of the tubular body 774 to establish a fluid volume between the sleeve 766 and the conduit 704. The mounting rings 770, 772 may be fastened, welded, threaded, or otherwise coupled to the caps 776, 778 and may have radially inwardly extending tongues 780 that fit into one or more corresponding grooves 782 in the conduit 704. One or more portions of the mounting rings 770, 772 may be constituted from semi-circumferential portions or halves to facilitate assembly of the tongue-and-groove connection.

Additionally, the conduit carrier 758 may include at least one baffle 784 located radially between the sleeve 766 and the conduit 704 to establish a circuitous path for a supply of gas to the conduit 704. More specifically, gas enters the conduit carrier 758 via the gas inlet 768, flows circumferentially around the baffle 784 and down to a lower end of the baffle 784 that has holes, reliefs, or at least some portions axially spaced from corresponding portions of the sleeve 766 of the conduit carrier 758. The gas flows through the holes or reliefs or around the lower end of the baffle 784, radially inwardly toward the conduit 704, and circumferentially around the conduit 704 between the conduit 704 and the baffle 784 and up and out of one or more gas outlets (not shown). Portions of the baffle 784 may be welded, fastened, interference fit, or otherwise coupled to corresponding portions of the sleeve 766.

Figure 25:
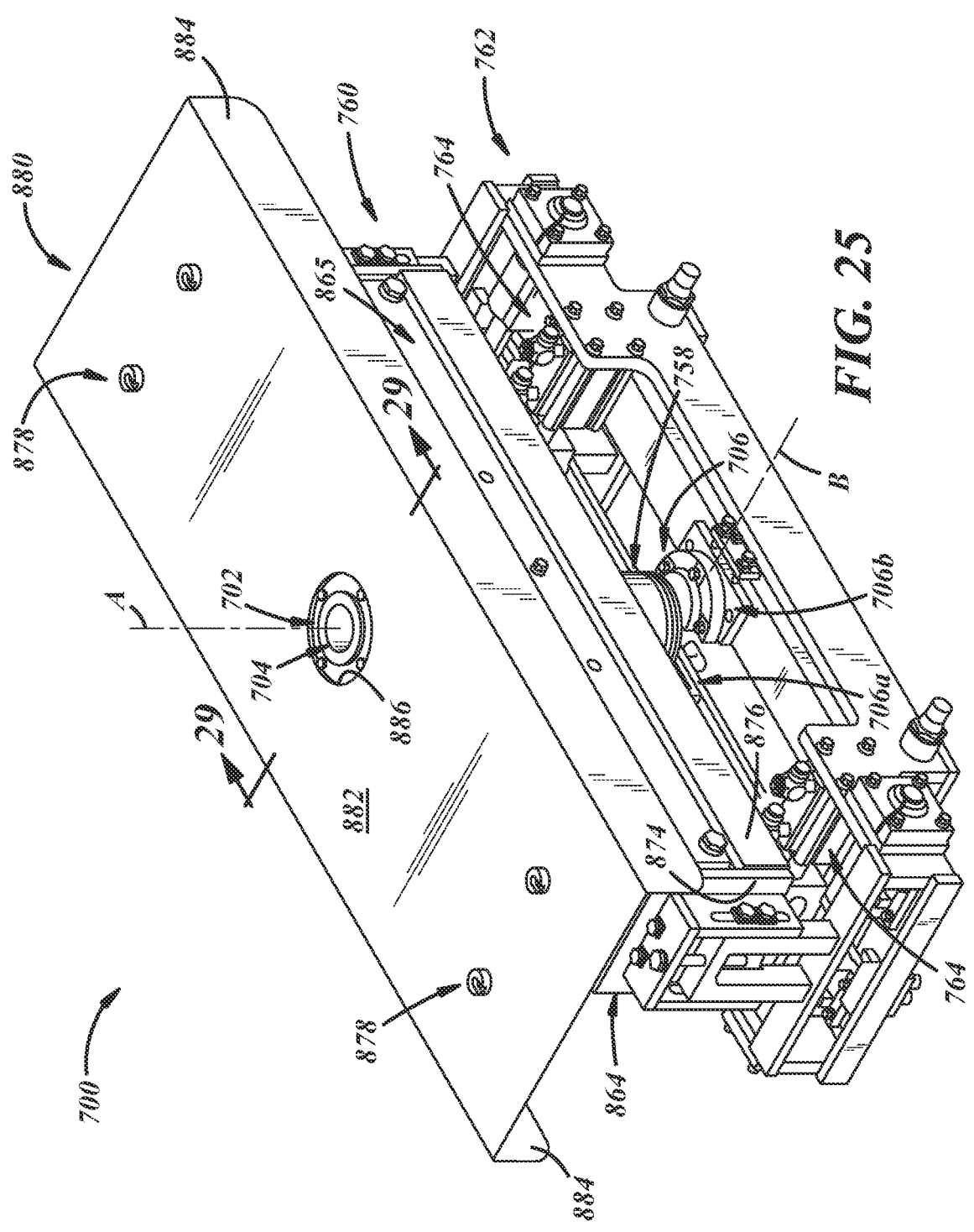
FIG. 25 is an upper perspective view of a molten glass transporter in accordance with an additional illustrative embodiment of the present disclosure, illustrating a conduit carrier and a split endcap carrier in an open position with respect to the conduit carrier.

With reference to FIG. 25, the conduit carrier mount 760 includes a mounting frame 864. The mounting frame 864 may include longitudinally extending side beams 865 extending perpendicularly with respect to the open/close axis B of the split endcap 706 and perpendicularly with respect to the conduit passage axis A, and coupled to the sleeve 766 of the conduit carrier 758. The mounting frame 864 may be constituted from a single unitary component or, as shown, may include separate components fastened, welded, threaded, or otherwise coupled together. With reference again to FIG. 29, the conduit carrier 758 includes mounting bosses 779 that may be oblong, may fit into corresponding oblong reliefs 868 in inboard surfaces of the beams 865, and may be fastened to the beams 865 by fasteners 870 extending through the beams 865 and into threaded passages in the oblong bosses 779. Those of ordinary skill in the art would recognize that the conduit carrier 758 may be coupled to the mount 760 by dovetail integral engagement or other mechanical mounting arrangements, or via welding, or in any other suitable manner.

With reference to FIGS. 27 and 28, the beams 865 may include mounting features, for instance, fastener passages 872 that may be laterally spaced on either side of the fasteners 870, that may be configured for coupling to any suitable type of transporter mover (not shown), such as a robot, a gantry, or the like. The mounting frame 864 of the conduit carrier mount 760 also may include end walls 874 extending between the beams 865 and side struts 876 extending between the end walls 874. The end walls 874 may be coupled to the beams 865 by fasteners 878 extending through end portions of the beams 865 and into corresponding portions of the end walls 874 that may overlap the end portions of the beams 865.

Figure 26:
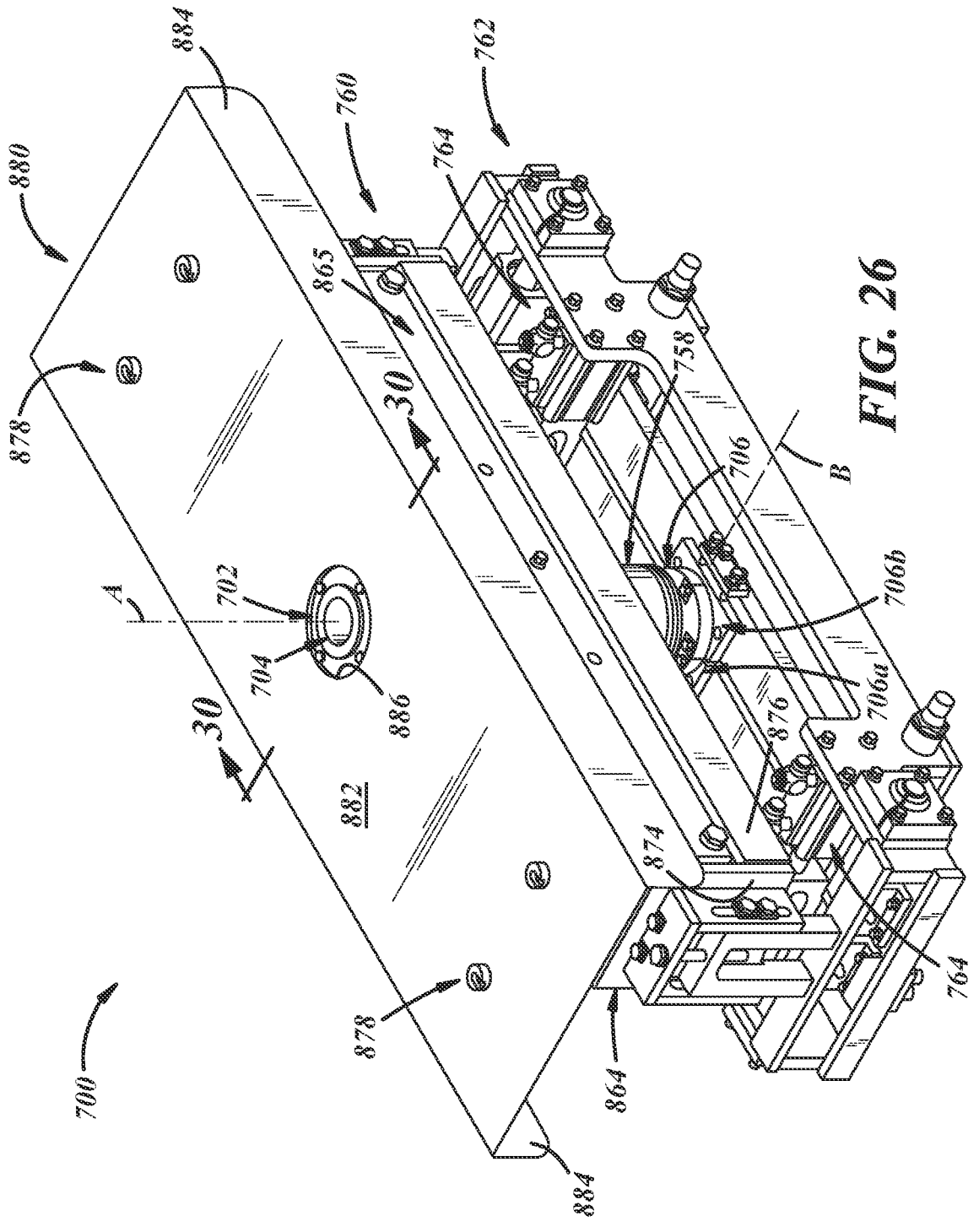
FIG. 26 is an upper perspective view of the molten glass transporter of FIG. 25, illustrating the split endcap and split endcap carrier moved to a closed position with respect to the conduit carrier.

With reference to FIGS. 25 and 26, the conduit carrier mount 760 also may include a cover 880 carried by the conduit carrier mount 760. The cover 880 may be longitudinally oblong and rectangular in plan view and may include a base wall 882, flanges 884 depending downwardly from lateral sides of the base wall 882, and an aperture 886 through the base wall 882 corresponding to and axially aligned with the conduit 704 of the transporter 700. The cover 880 may be spaced above and mounted to the mounting frame 864 of the conduit carrier mount 760, for example, via several fasteners 888 fastened to the mounting frame 864 and to the cover 880. The cover 880 may protect the transporter 700 from any molten glass that might otherwise inadvertently fall onto the transporter 700 instead of into the transport cup 702.

Figure 30A:
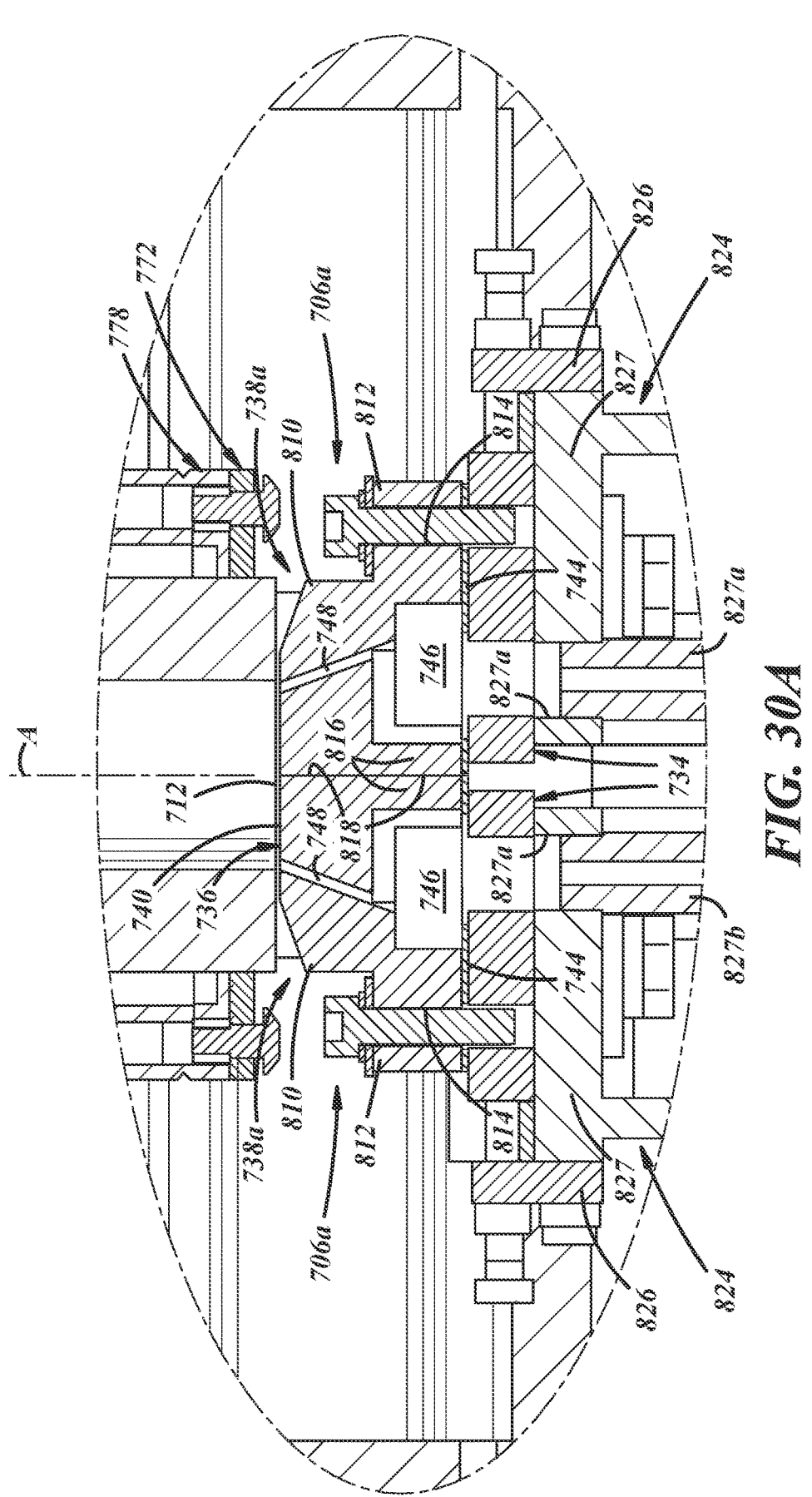
FIG. 30A is a further enlarged cross-sectional view of the transport cup of FIG. 30, taken from oval 30A.
Figure 31:
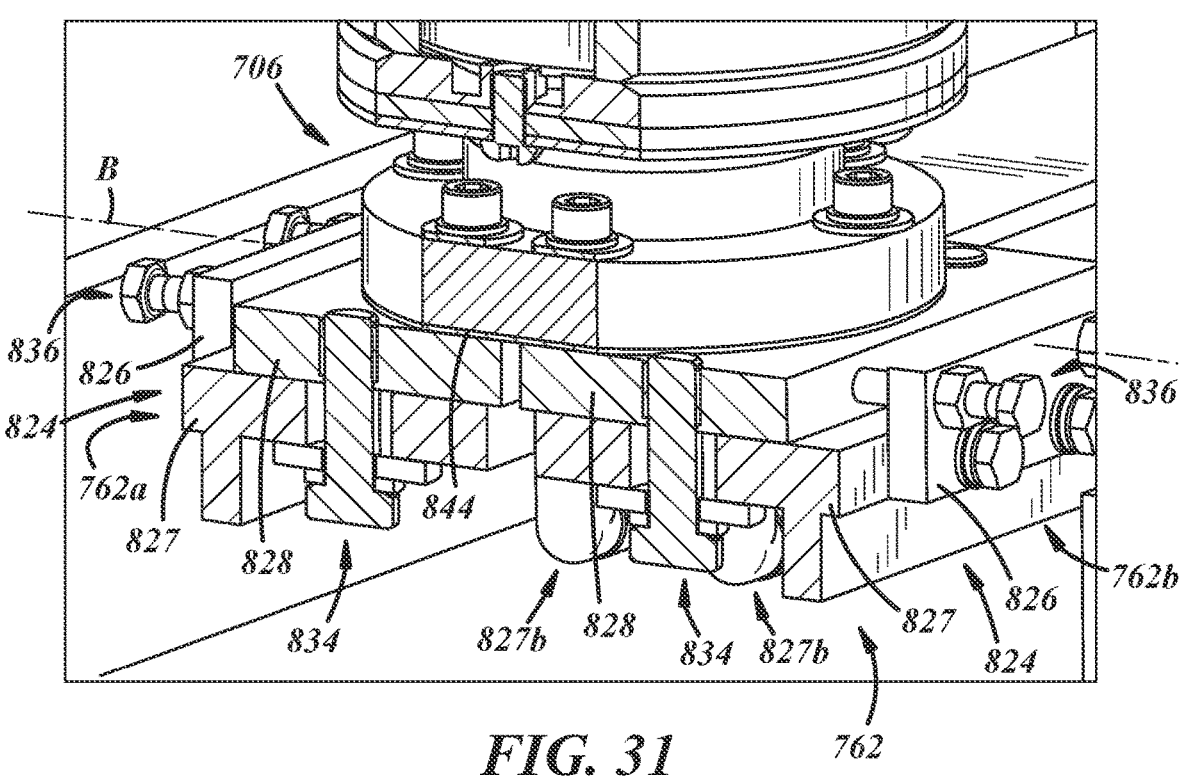
FIG. 31 is an enlarged, fragmentary, perspective, cross-sectional view of a portion of the transporter of FIG. 25, and illustrating a mounting arrangement of the split endcap carrier.

With reference now to FIG. 31, the endcap carrier 762 includes outer holders 824 having sidewalls 826 and lower walls 827 coupled to the sidewalls 826, and inner mounting blocks 828 carried by the outer holders 824. The lower walls 827 of the holders 824 may be longitudinally extending oblong rails extending perpendicularly with respect to the open/close axis B of the split endcap 706, and the sidewalls 826 of the holders 824 may include discrete plates fastened to sides of the rails. The lower walls 827 have fluid ports 827a (FIG. 30A) therein that are coupled to fluid fittings 827b (FIG. 30A), for example, via threaded connections. The endcap carrier halves 762a,b further may include apertured gaskets 844 between the mounting blocks 828 and the endcap halves 706a,b. The mounting blocks 828 may be movably fastened to the lower walls 827 of the outer holders 824 by fasteners 834 having threaded ends threaded into corresponding threaded holes in the inner mounting blocks 828, shanks extending through enlarged holes in the lower walls 827 of the outer holders 824, and heads trapping washers to the lower walls 827 of the outer holders 824. Also, positions of the inner mounting blocks 828 may be finely adjusted by set screws 836 extending through the sidewalls 826 of the outer holders 824 and engaged to the inner mounting blocks 828. Those of ordinary skill in the art would recognize that the fasteners 834 can be loosened, the set screws 836 turned, the inner mounting blocks 828 moved to desired positions, and the fasteners 834 tightened to lock the inner mounting blocks 828 in their desired positions to ensure a desired location of the endcap halves 706a,b relative to one another and/or to the conduit 704.

Figure 32:
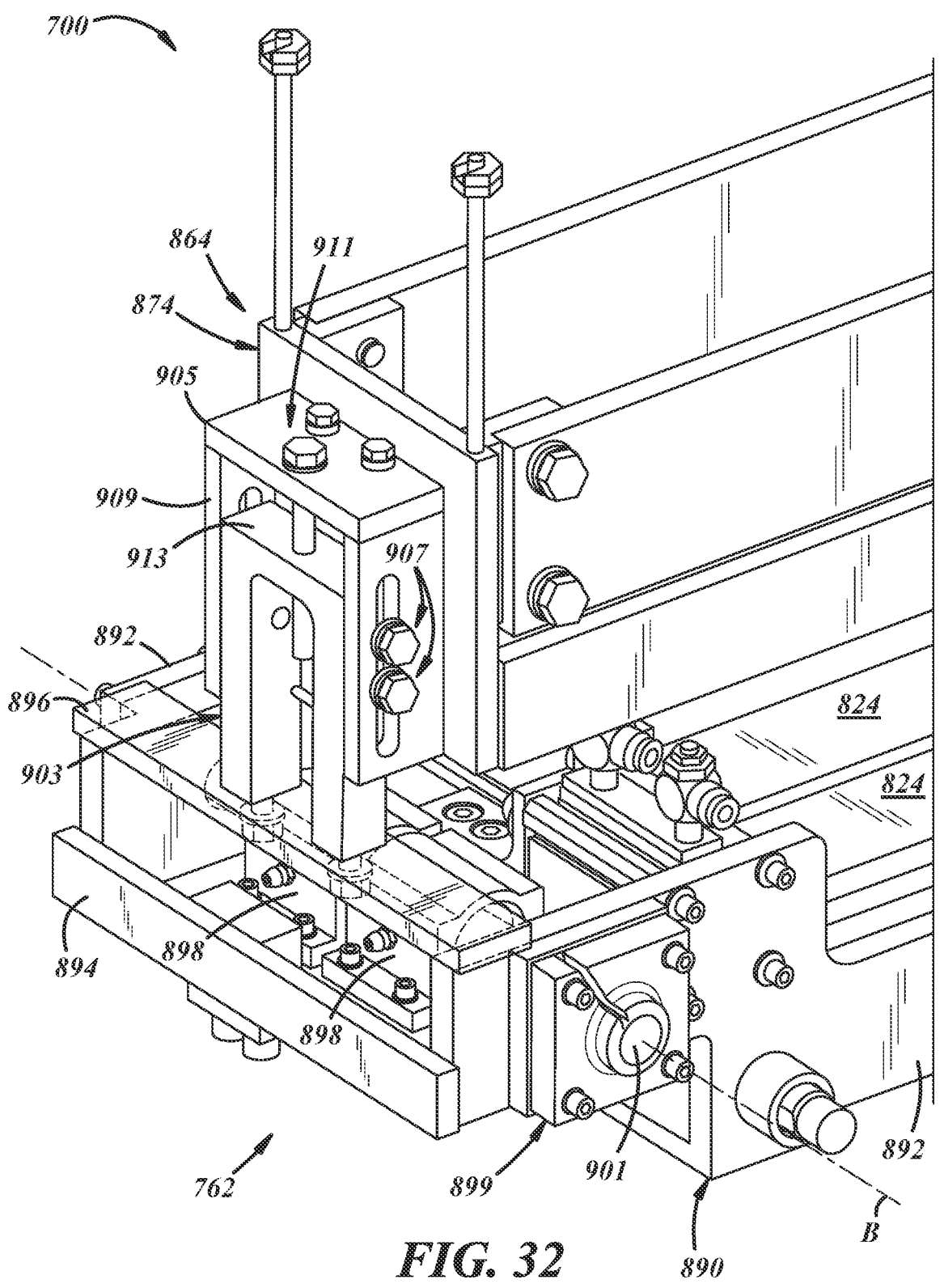
FIG. 32 is an enlarged, fragmentary, perspective view of an end portion of the transporter of FIG. 25, and illustrating a coupling arrangement between a conduit carrier mount and the endcap carrier.

With reference now to FIG. 32, the endcap carrier 762 also may include an endcap carrier frame 890 including sidewalls 892 extending perpendicular to the open/close axis B, and lower and upper end walls 894, 896 extending between and coupled to the sidewalls 892. The outer holders 824 may be laterally slidably coupled to the endcap carrier frame 890. More specifically, the outer holders 824 may be coupled to the endcap carrier frame 890 via movable pillow blocks or bearings 898 fastened to end portions of the lower walls 827 of the outer holders 824 and a shaft 901 extending through the bearings 898 and rotatably coupled to the sidewalls 892 of the endcap carrier frame 890 via fixed mounting blocks or bearings 899.

Also, with reference to FIG. 32, the endcap carrier frame 890 may be adjustable, for instance, axially adjustable, with respect to the mounting frame 864 of the conduit carrier mount 760. More specifically, the mounting frame 890 of the endcap carrier 762 may include extensions 903 coupled to and extending upwardly from the upper end walls 896, and the mounting frame 864 of the conduit carrier mount 760 may include a corresponding extension 905 coupled to and extending outward from the ends 874 of the mounting frame 864. One or more fasteners 907 may extend through slots in sidewalls 909 of the extension 905 of the mounting frame 864 and into one or more corresponding threaded holes in the endcap carrier frame extensions 903. Set screws 911 may extend through the mounting frame 864 and into threaded passages in an upper wall 913 of the endcap carrier frame extensions 903. Those of ordinary skill in the art would recognize that the fasteners 907 can be loosened, the set screw 911 turned, the extension 903 and the rest of the endcap carrier frame 890 moved to a desired position, and the fasteners 907 tightened to lock the endcap carrier frame 890 in a desired position relative to the mounting frame 864 to ensure desired location of the endcap halves 706a,b (FIG. 30) relative to the conduit 704 (FIG. 30). Those of ordinary skill in the art would recognize that the illustrated axially adjustable apparatus, or dovetail rails and set screws, or any other axially adjustable apparatus suitable for use in a glassmaking environment may be used.

Figure 33:
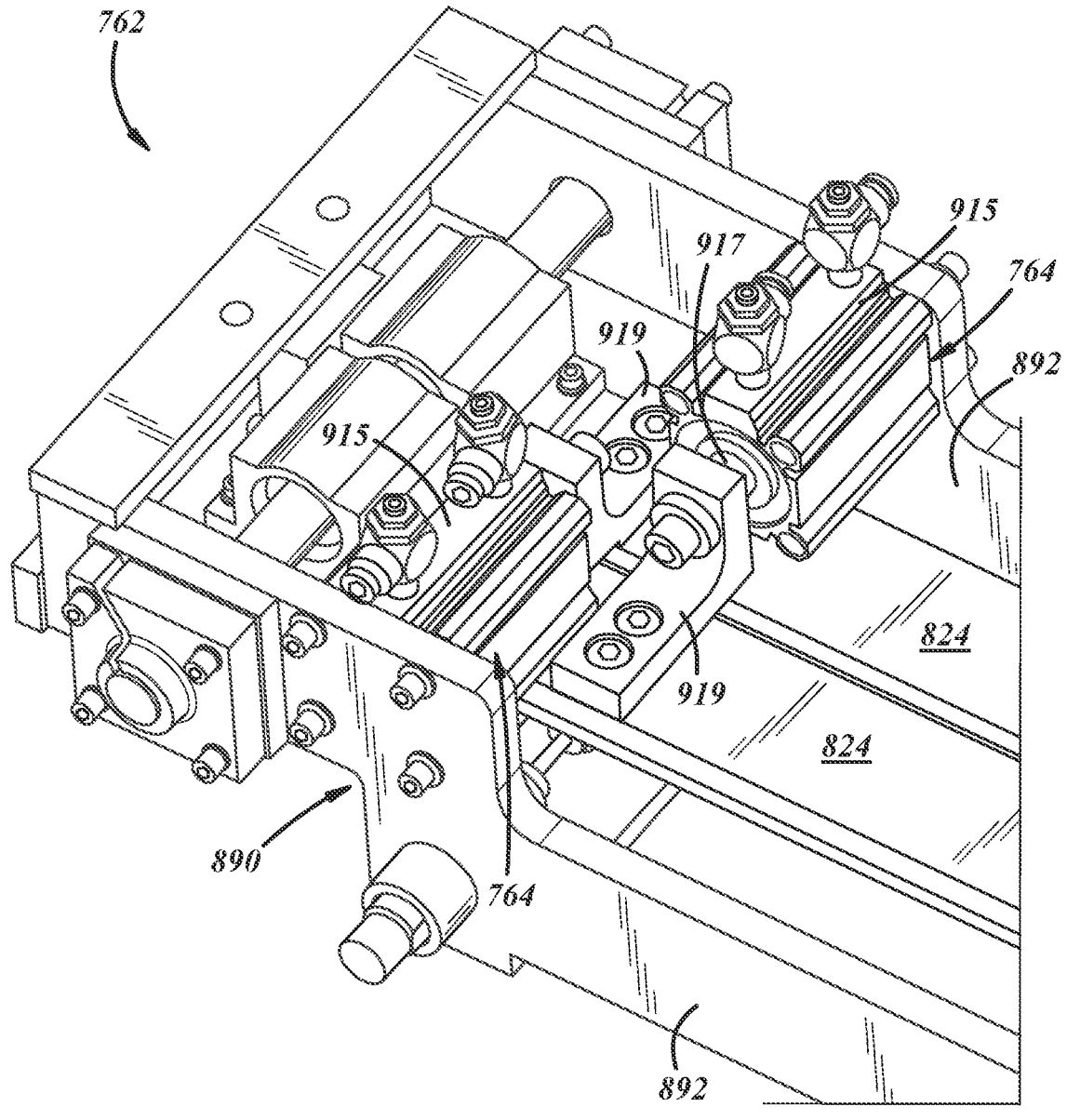
FIG. 33 is an enlarged, fragmentary, perspective view of an end portion of the endcap carrier shown in FIG. 32, and illustrating an actuator mounting arrangement.

With reference now to FIG. 33, the endcap carrier 762 includes the endcap actuators 764 that may be coupled between the endcap carrier frame 890 and the corresponding endcap holders 824. More specifically, the endcap actuators 764 may be fixed to sidewalls 892 of the endcap carrier frame 890 and to upper surfaces of distal instances of the holders 824. For example, the actuators 764 may be or may include cylinders having cylinder bodies 915 fastened to inside surfaces of the endcap carrier frame sidewalls 892 and cylinder rods 917 fixed to adapter brackets 919 fastened to upper surfaces of the corresponding holders 824. The actuators 764 may be coupled to a common control valve (not shown), or in any other manner suitable for simultaneous activation of the actuators 764 to impart equal and opposite motion to the holders 824 and, thus, to the endcap halves 706a,b (FIG. 29). The actuators 764 may be pneumatic or hydraulic, or may include an electric device such as a linear motor, a rotary motor with a drive screw, a solenoid, or any other arrangement suitable to cause linear movement.

With reference again to FIG. 29, the transporter 700 also may include cushions 921 operatively coupled between the endcap carrier frame 890 and the endcap halves 706a,b to cushion the opening of the endcap halves 706a,b. The cushions 921 may include cylinders 923 fixed to the sidewalls 892 of the endcap carrier frame 890, and pistons 925 engageable with extensions 824a of the holders 824 that extend downwardly from the lower walls 827 of the holders 824. Accordingly, when the actuators 764 are activated to open the endcap halves 706a,b, the holder extensions 824a contact the pistons 925 and move the pistons 925 into the cylinders 923 to provide a cushioned opening of the endcap halves 706a,b and thereby reduce vibration. Those of ordinary skill in the art would recognize that the cushions could include elastomeric cushions, viscoelastic cushions, or any other cushions suitable for use in a glass manufacturing environment.

With reference again to FIGS. 25-29, the transporter 700 is illustrated to include only one transport cup 702 and carrier 758 but, in other embodiments, the transporter 700 could include additional transport cups and carriers. For example, two additional transport cups and carriers could be located longitudinally outboard of the illustrated transport cup 702 and carrier and coupled to the rest of the transporter 700 in a manner similar to that of the illustrated transport cup 702 and carrier 758. Accordingly, the transporter 700 would be configured to receive a plurality of molten glass charges from a plurality of orifices of a feeder, transport the charges, and dispense the charges into a corresponding plurality of blank molds.

Figure 34:
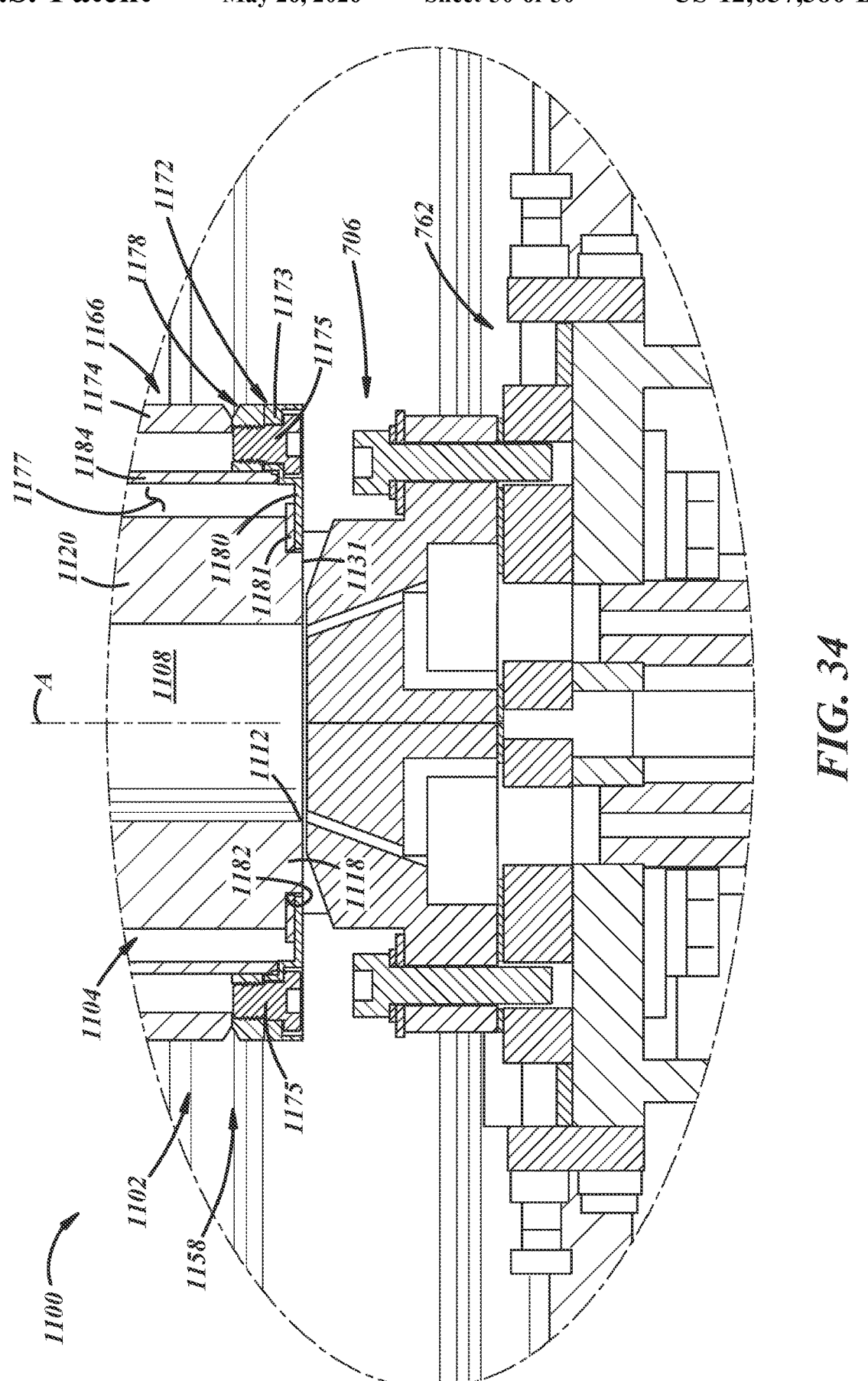
FIG. 34 is a fragmentary cross-sectional view of a transport cup, illustrating another mounting arrangement of a conduit within a conduit carrier.

FIG. 34 shows another illustrative embodiment of a molten glass transporter 1100. This embodiment is similar in many respects to the embodiments of FIGS. 1-33 and like numerals among the embodiments generally designate like or corresponding elements throughout the several views of the drawing figures. Accordingly, the descriptions of the embodiments are incorporated into one another, and description of subject matter common to the embodiments generally may not be repeated here.

The transporter 1100 includes a transport cup 1102 including a conduit 1104 and a conduit carrier 1158, and the endcap 706 of the embodiment of FIGS. 25-33 and carried by the endcap carrier 762 of that embodiment. The conduit 1104 includes an outlet 1112 and an outlet end 1118, and a sidewall 1120 extending away from the outlet end 1118 and establishing a transport cup cavity 1108.

The conduit carrier 1158 may include a vertically extending oblong sleeve 1166 that may be radially spaced from the conduit 1104, a lower mounting and sealing ring 1172 coupled to the sleeve 1166 and engaged to corresponding portions of the conduit 1104 as will be described in greater detail below. The sleeve 1166 may include a tubular body 1174 and a lower cap 1178 that may be fastened, welded, threaded, or otherwise coupled to a corresponding lower end of the tubular body 1174 to establish a gas volume 1177 between the sleeve 1166 and the conduit 1104. The conduit carrier 1158 also may include a baffle 1184 located radially between the sleeve 1166 and the conduit 1104 to direct gas supplied through the conduit carrier 1158 to the conduit 1104. Again, the gas may include air, oxygen, nitrogen, or any other gas suitable for contact with molten glass, and may be pressurized. A lower portion of the baffle 1184 may be welded, fastened, interference fit, or otherwise coupled to a corresponding portion of the sleeve lower cap 1178 and/or lower mounting and sealing ring 1172. The baffle 1184 that has holes, reliefs, or at least some portions axially spaced from corresponding portions of the conduit carrier 1158 so that gas flows through the holes or reliefs or around the lower end of the baffle 1184, radially inwardly toward the conduit 1104, and circumferentially around the conduit 1104 between the conduit 1104 and the baffle 1184. In embodiments, where the conduit 1104 is composed of a permeable material, gas may diffuse through the conduit 1104 to apply gas pressure to the interior thereof.

Also, the lower mounting and sealing ring 1172 may include a mounting portion 1173 at a radially outer portion of the ring 1172 and that may be mounted to the lower cap 1178, for example, fastened to the lower cap 1178 via one or more fasteners 1175, or may be welded, threaded, or otherwise coupled thereto. The lower mounting and sealing ring 1172 also may include a conduit support and sealing flange 1180 extending radially inwardly from the mounting portion 1173 and that may carry a seal 1181 for location between the conduit support and sealing flange 1180 and the conduit 1104. The seal 1181 may include an annular gasket, and may be composed of a material different from that of the conduit support and sealing flange 1180. In further embodiments, the conduit support and sealing flange 1180 and the seal 1181 may be a unitary or monolithic component.

The conduit 1104 may include a recessed shoulder 1182 such that the outlet end 1118 of the conduit 1104 may be stepped so as to have a pilot diameter and a step that intersect at the shoulder 1182. Therefore, the mounting flange 1180 and the seal 1181 may radially overlap and be in registration with the stepped outlet end 1118 to carry and support the conduit 1104 thereon. More specifically, a lower surface of the conduit support and sealing flange 1180 may even be flush with an outlet end surface 1131 of the conduit 1104. In other embodiments, however, the outlet end 1118 of the conduit 1104 may not be stepped such that the conduit support and sealing flange 1180 and seal 1181 may radially overlap and support a lower end surface of such a non-stepped conduit.

The gas creates a positive pressure differential between the gas volume 1177 and transport cup cavity 1108, which drives flow of the gas through the sidewall 1120 of the conduit 1104 via diffusion. The baffle 1184, with or without, the gas exhaust outlets 569 promotes both a uniform gas flow rate over the entire outer surface of the sidewall 1120 of the conduit 1104 and allows for the pressure differential to be uniform around and across the outer surface, producing uniform diffuse flow through the sidewall 1120 along the length of the conduit 1104.

Figure 35:
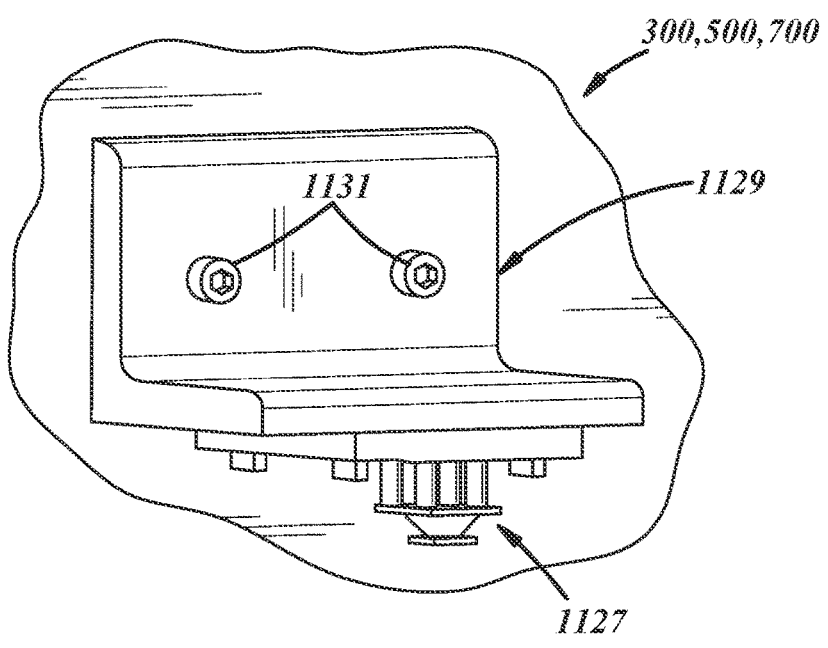
FIG. 35 is a fragmentary perspective view of an accelerometer carried by a mounting plate, which is carried by a mounting bracket, which is carried by a portion of a molten glass transporter.

With reference now to FIG. 35 specifically, any of the presently disclosed transporters 100, 300, 500, 700, 1100, may include or may be instrumented with an accelerometer 1127 that may be mounted to any suitable portion of the transporters 100, 300, 500, 700, such as the conduit carriers or the conduit carrier mounts. The accelerometer 1127 may be mounted to the transporters via a mounting bracket 1129 and fasteners 1131 as illustrated in FIG. 35, or in any other manner suitable for use in a glassmaking industrial environment. The accelerometer 1127 may include a multi-axis accelerometer.

In general, the accelerometer 1127 may facilitate a solution to a problem of excessive vibration, bouncing, jostling, and the like of a glass charge during transport from a glass charge feeder to blank molds of a glass container molding machine, wherein such undesirable motion may lead to deformation and quality reduction of glass charges delivered to the blank molds. Previous attempts to verify quality of glass charge delivery included cameras configured to capture images of glass gobs falling through lengthy delivery chutes, troughs, deflectors, and the like. But the cameras suffer from several drawbacks including difficulty in mounting the cameras, high maintenance required by the cameras, slow imaging times, and the like.

Accordingly, the accelerometer 1127 may measure acceleration during receiving, transporting, and dispensing of the glass charges. Accelerometer output can be used to infer useful data including: quality of loading or receiving of glass charges, levels of vibration of the transporter during transport, and/or levels of vibration during dispensing of the glass charges. In a specific example, a duration and magnitude of cup motion upon loading of a glass charge may provide an indication of the effectiveness of fluid supply to the transport cup. For instance, a longer duration but lower peak-to-peak vibration on loading will indicate that the charge is being cushioned on its initial impact, which cushioning is desirable to prevent a hard impact of a nose of the charge on the endcap and thereby prevent concomitant heat loss between the nose and endcap and attendant cooling and misshaping the nose of the charge. In another specific example, deflections of the transporter caused by a particular profile of acceleration of the transporter can be used to determine better or ideal acceleration profiles for the transporter to minimize vibration of the charge when the charge is unloaded into a blank mold. In a further specific example, vibration levels of the transporter in all three orthogonal directions can be observed during charge unloading, used to monitor the state of the opening and closing mechanisms, and aid in optimizing movement of the transporter and/or actuation of the opening and closing mechanism for minimal vibration. It has been shown in testing that vibration of the transporter during the unloading process can lead to variation in molten glass charge surface temperature, as well as deviation of the charge from a falling vertical trajectory. Finally, the accelerometer 1127 can be used to assess overall tightness of the transporter, for example, to diagnose potential fastener loosening, component wear, and the like.

Those of ordinary skill in the art would recognize that the accelerometer 1127 can be used as an input to a controller for the transporter and/or for a mover for the transporter such as a robot, a gantry, or the like, or any other suitable equipment used with the transporter. Such a controller may receive input data and instructions from a user, the accelerometer 1127, and/or any other suitable inputs, process the received input in light of stored software and/or data, and transmit output signals to the transporter, the mover for the transporter, or any other suitable equipment used with the transporter. The controller generally may include memory, a processor coupled to the memory, one or more interfaces coupled to the processor, one or more input devices coupled to the processor, and/or one or more output devices coupled to the processor. Of course, the computing apparatus further may include any ancillary devices, for example, clocks, internal power supplies, and/or the like (not shown), and may be supplied with electricity by an external power supply, for example, AC utility or plant power, an AC to DC transformer, one or more batteries, fuel cells, and/or the like.

A method of transporting a molten glass charge may include the following general steps. First, the method may include receiving a molten glass charge in a transport cup having a conduit and an endcap to selectively open and close the conduit and that may establish an interior junction between the endcap and the conduit. In this step, the molten glass charge may or may not be in direct circumferentially continuous contact with an inner surface of the conduit over at least a portion of a length of the charge, and may or may not be in axial contact with an end surface of the endcap. Second, the method may include supplying fluid into the transport cup in a least one location to displace at least a portion of the glass charge away from the transport cup, and thereby establish a gap between the molten glass charge and the transport cup. In a specific example, fluid may be supplied into the transport cup proximate the interior junction to displace at least a portion of the glass charge away from the interior junction. Third, the method includes controlling an amount of the fluid in the transport cup between the molten glass charge and the transport cup. In some embodiments, the amount of the fluid may be controlled by the size, quantity, and configuration of fluid passages that supply the fluid, by fluid control valves, and/or the like. In other embodiments, the amount of fluid may be controlled by diffusive material characteristics of the transport cup material(s). Fourth, the method includes moving the endcap to permit the molten glass charge to exit the conduit. The method, therefore, facilitates avoidance of cold spots and/or parting lines formed in the molten glass charge and, thus, facilitates avoidance of carry-through of the cold spots and/or parting lines to a finished glass container formed from the molten glass charge. The method also may include transporting the transport cup by translating, rotating, inverting, articulating, displacing, or otherwise moving the transport cup in any manner suitable for handling molten glass.

In more specific implementations, the method also may include one or more of the following steps. The method may include receiving the molten glass charges from a molten glass charge feeder. Similarly, the method may include dispensing multiple molten glass charges from a molten glass feeder that has multiple orifices to produce multiple molten glass charges for receipt in multiple transport cups carried by a common transport cup carrier. Also, the method may include dispensing the molten glass charge into a blank mold having an inlet that may be located below, above, or level with, the molten glass charge feeder. More specifically, the method may include dispensing multiple molten glass charges from a molten glass feeder that has multiple orifices to produce multiple molten glass charges for receipt in multiple transport cups carried by a common transport cup carrier.

In one embodiment, the controlling step includes venting the fluid from the gap out of the transport cup through at least one exhaust vent. The venting step may include venting the fluid through a fluid exhaust outlet established between an outlet end of the conduit and an upper end of the endcap, and/or venting the fluid between mating faces of split halves of the endcap.

In an embodiment, the supplying step includes supplying fluid in a least one location proximate an interior junction between the conduit and the endcap to displace a portion of the molten glass charge away from the interior junction. Also or instead, the supplying step may include supplying the fluid through a central portion of the endcap to displace at least a portion of the molten glass charge away from the central portion of the endcap. The supplying step may include supplying the fluid over an end surface of the endcap to displace the molten glass charge away from the end surface of the endcap.

In an embodiment, the method also may include modulating a flow of the fluid over time to produce different displacement forces on the molten glass charge. More specifically, the modulating step may include setting a flow rate of the fluid to an initial, relatively higher, level when the molten glass charge is being received in the transport cup, to a sustained, relatively lower or intermediate, level when the molten glass charge is in a steady-state with respect to the transport cup, and to a final, relatively lower or lowest, level when the molten glass charge is being dispensed from the transport cup. Without being bound by theory, it is believed that the flow rates are dependent on one or more of the following variables: gob weight, gob diameter, cup conduit diameter, cup conduit length, or drop height from the shears to the endcap of the cup (which affects initial velocity of the gob on loading of the gob into the cup). For the initial flow rate, it may be desirable to avoid insufficient flow and, therefore, provide a flow rate sufficient to fully halt progress of the gob so it does not impact the endcap of the cup or almost fully halt progress of the gob before it impacts the cup endcap, in order to minimize the impact force of the gob on the endcap and, thus, minimize initial heat loss from the gob. Conversely, for the initial flow rate, it may be desirable to avoid excessive flow that would otherwise cause the gob to fail to fully load into the cup or, worse yet, that would otherwise eject the gob back out of the cup. For the sustained flow rate, it may be desirable to provide a flow rate sufficient to prevent the glass gob from flowing into the vent gap around the bottom of the conduit and/or the fluid supply passages. Conversely, for the sustained flow rate, it may be desirable to avoid excessive flow that would otherwise push the gob back up the cup sleeve or eject it from the cup. In a specific example, it was discovered that a 180 g gob of 21.5 mm outermost diameter falling by gravity into a 330 mm straight bore sleeve of a 23.8 mm innermost diameter requires an initial flow rate of 2.4 g/s, and a sustained flow rate of 2.0 g/s. In another specific example, a 180 g gob of 22.5 mm outermost diameter falling by gravity into a 330 mm straight bore sleeve of a 26.4 mm innermost diameter requires an initial flowrate of 3.0 g/s and a sustained flow rate of 2.8 g/s. In both of the aforementioned examples, the transport cup had an axial exhaust/vent gap of 0.4 mm between corresponding lower and upper surfaces, respectively, of the conduit and the endcap.

In an embodiment, the method also includes cooling an exterior or outer surface of the conduit to regulate the temperature of the conduit. The cooling step may include introducing fluid around a lower portion of the conduit and directing the fluid to flow upward to and around an upper portion of the conduit. The cooling step may include constricting an outlet for the fluid relative to an inlet for the fluid to increase flow velocity of the fluid and heat transfer between the conduit and the fluid. The method also may include measuring an interior surface temperature of the conduit with a non-contact optical thermal sensor, and controlling a flow of the fluid to maintain the interior surface temperature between 320 and 450 degrees Celsius.

In an embodiment, the moving step includes translating the endcap along a straight line or an arc, moving halves of the endcap away from one another, and/or articulating the endcap vertically down and laterally away with respect to the conduit.

In an embodiment, the method also may include measuring acceleration during at least one of the receiving step, a step of moving the transport cup, or the step of moving the endcap to dispense the molten glass charge.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A molten glass transport cup, comprising:
   a conduit having an inlet, an outlet, and a passage extending between the inlet and the outlet along a conduit passage axis;
   an endcap to selectively cover and uncover the conduit outlet, and being movable relative to the conduit to a closed position where the endcap covers the conduit outlet, and to an open position where the endcap uncovers the conduit outlet;
   a fluid exhaust outlet between the conduit and the endcap; and
   one or more fluid supply passages having one or more interior inlets located radially inwardly of the fluid exhaust outlet.

2. The molten glass transport cup of claim 1, wherein an interior junction is established between the endcap and the conduit and the one or more interior inlets of the one or more fluid supply passages are located proximate the interior junction.

3. The molten glass transport cup of claim 1, wherein the one or more fluid supply passages are located radially inward of a side periphery of the endcap, and are open to an upper end of the endcap in communication with the conduit outlet at a location that overlaps or is spaced radially inward from a junction defined between the conduit and the endcap when the endcap is in the closed position.

4. A molten glass transporter, comprising:
   the molten glass transport cup of claim 1;
   a conduit carrier in which the conduit is carried;
   an endcap carrier on which the endcap is carried; and
   an endcap actuator coupled to the endcap carrier, and activatable to move the endcap to uncover and to cover the outlet of the conduit.

5. The molten glass transporter of claim 4, wherein when the endcap actuator is activated, the endcap swings, translates, or articulates away from the outlet of the conduit.

6. The molten glass transport cup of claim 1, wherein the endcap includes:
   a lower end;
   an upper end axially opposite of the lower end; and
   a plurality of endcap fluid supply passages extending between the lower and upper ends and having lower openings open to the lower end and upper openings open to the upper end.

7. The molten glass transport cup of claim 6, wherein the upper end includes an end surface and an oblique surface obliquely extending between the end surface and a side periphery of the endcap, wherein the plurality of endcap fluid supply passages includes a circular array of endcap fluid supply passages extending through the oblique surface.

8. The molten glass transport cup of claim 6, wherein the plurality of endcap fluid supply passages extend through the endcap at one or more oblique angles with respect to a conduit axis.

9. The molten glass transport cup of claim 6, wherein the lower end includes a base surface and a fluid pocket in the base surface in open fluid communication with the lower openings of the plurality of endcap fluid supply passages.

10. The molten glass transport cup of claim 6, wherein the plurality of endcap fluid supply passages includes an inner circular array of endcap fluid supply passages and an outer circular array of endcap fluid supply passages positioned radially outward of the inner circular array of endcap fluid supply passages.

11. The molten glass transport cup of claim 6, wherein the endcap is axially split into halves having mating faces, wherein an endcap fluid exhaust outlet is established between the mating faces.

12. The molten glass transport cup of claim 1, wherein the passage of the conduit is open to the inlet and the outlet and is partly established by an interior surface at the outlet, and the endcap is cooperative with the outlet of the conduit to establish a transport cup cavity, wherein at least one fluid supply passage of the one or more fluid supply passages overlaps, or is disposed radially inward and proximate with respect to, the interior surface of the conduit at the outlet of the conduit.

13. The molten glass transport cup of claim 12, wherein a fluid exhaust outlet is established between an outlet end of the conduit and an upper end of the endcap.

14. A molten glass transporter, comprising:
the molten glass transport cup of claim 1; and
a conduit carrier carrying the transport cup therein and including a sleeve at least partially circumscribing the conduit of the transport cup.

15. The molten glass transporter of claim 14, wherein the sleeve of the conduit carrier is radially spaced away from the conduit to establish a gas volume.

16. The molten glass transporter of claim 15, wherein the conduit carrier further includes a gas baffle radially spaced between and away from the sleeve and the conduit of the transport cup.

17. The molten glass transporter of claim 16, wherein the conduit carrier further includes
one or more gas inlets, and
one or more gas outlets,
wherein a circuitous path is established from the one or more gas inlets, circumferentially around the gas baffle and down to a lower end of the gas baffle, down and around at least a portion of the gas baffle that is axially spaced from a corresponding portion of the sleeve, radially inwardly toward the conduit, circumferentially around the conduit between the conduit and the gas baffle, and up and out of the one or more gas outlets.

18. The molten glass transporter of claim 14, wherein the sleeve includes a tubular body, a lower cap, and a lower mounting ring coupled to the lower cap and including a radially inwardly extending mounting flange carried by a stepped outlet end of the conduit.

19. The molten glass transporter of claim 14, further comprising an endcap carrier carrying the endcap underneath the conduit, and an endcap actuator to move the endcap carrier and the endcap between a closed position covering the outlet of the conduit and an open position exposing the outlet of the conduit, wherein the endcap carrier includes a pivotable arm, and the endcap actuator includes a rotary and linear actuator coupled to the pivotable arm and mounted to the sleeve of the conduit carrier.

20. The molten glass transporter of claim 14, further comprising an endcap carrier carrying the endcap underneath the conduit, and an endcap actuator to move the endcap carrier and the endcap between a closed position covering the outlet of the conduit and an open position exposing the outlet of the conduit, wherein the endcap is a split endcap and the endcap carrier is a split endcap carrier, and wherein the endcap actuator includes a first actuator to move the split endcap carrier up and down, and a second actuator to move halves of the split endcap carrier laterally back and forth toward and away from one another.

21. The molten glass transporter of claim 14, further comprising an accelerometer coupled to the conduit carrier or a conduit carrier mount, wherein the accelerometer is a multi-axis accelerometer to measure acceleration during receiving, transporting, and/or dispensing of molten glass charges, wherein accelerometer output is used to infer quality of receiving of glass charges, levels of vibration of the transporter during transport, and/or levels of vibration during dispensing of the glass charges.

22. The molten glass transport cup of claim 1, wherein the fluid exhaust outlet is configured to vent gas to the atmosphere.

23. The molten glass transport cup of claim 1, wherein the fluid exhaust outlet includes one or more exhaust gaps between corresponding surfaces of the conduit and the endcap and/or one or more exhaust reliefs in at least one of the corresponding surfaces.

24. A molten glass transporter, comprising:
a molten glass transport cup, including
a conduit having an inlet, an outlet, and a passage extending between the inlet and the outlet along a conduit passage axis; and
an endcap to selectively cover and uncover the conduit outlet;
a carrier configured to carry the molten glass transport cup; and
an accelerometer coupled to the conduit, the carrier, or the endcap.

25. The molten glass transport cup of claim 24, wherein the accelerometer is a multi-axis accelerometer to measure acceleration during receiving, transporting, and/or dispensing of molten glass charges, wherein accelerometer output is used to infer quality of receiving of glass charges, levels of vibration of the transporter during transport, and/or levels of vibration during dispensing of the glass charges.

* * * * *